(12) United States Patent
Zhang

(10) Patent No.: US 11,737,101 B2
(45) Date of Patent: Aug. 22, 2023

(54) UPLINK INFORMATION SENDING METHOD AND APPARATUS, BASE STATION, AND USER EQUIPMENT

(71) Applicant: Huawei Technologies Co., Ltd., Shenzhen (CN)

(72) Inventor: Lili Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 99 days.

(21) Appl. No.: 17/380,898

(22) Filed: Jul. 20, 2021

(65) Prior Publication Data

US 2022/0015090 A1    Jan. 13, 2022

Related U.S. Application Data

(63) Continuation of application No. 16/301,385, filed as application No. PCT/CN2016/082153 on May 13, 2016, now Pat. No. 11,516,779.

(51) Int. Cl.
*H04W 72/21* (2023.01)
*H04B 7/06* (2006.01)
(Continued)

(52) U.S. Cl.
CPC .......... *H04W 72/21* (2023.01); *H04B 7/0626* (2013.01); *H04L 1/1812* (2013.01); *H04W 72/0446* (2013.01); *H04W 74/0833* (2013.01)

(58) Field of Classification Search
None
See application file for complete search history.

(56) References Cited

U.S. PATENT DOCUMENTS

| 2009/0135769 A1 | 5/2009 | Sambhwani et al. |
| 2012/0213151 A1 | 8/2012 | Zhao et al. |

(Continued)

FOREIGN PATENT DOCUMENTS

| CN | 101447826 A | 6/2009 |
| CN | 101778482 A | 7/2010 |

(Continued)

OTHER PUBLICATIONS

"Specification impact of supporting SRS switching", 3GPP TSG RAN WG1 Meeting #84bis, Busan, Korea, R1-163055, 3rd Generation Partnership Project, Valbonne, France (Apr. 11-15, 2016).

(Continued)

*Primary Examiner* — Chi H Pham
*Assistant Examiner* — Raul Rivas
(74) *Attorney, Agent, or Firm* — Leydig, Voit & Mayer, Ltd.

(57) ABSTRACT

Embodiments of the present invention provide an uplink information sending method, including: sending, by a base station, at least one of first transmission indication information of first uplink information and second transmission indication information to user equipment UE, where the first transmission indication information includes a subframe and/or a carrier on which the base station instructs the UE to send the first uplink information; and the first transmission indication information and/or the second transmission indication information are/is used to indicate UE behavior when a collision occurs. The uplink information sending method provided in the present invention is used to mitigate impact of a carrier collision on processing efficiency of the UE.

19 Claims, 4 Drawing Sheets

A base station sends at least one of first transmission indication information of first uplink information and second transmission indication information to UE — S101

The UE determines, based on the first transmission indication information and/or the second transmission indication information, UE behavior when a collision occurs — S102

(51) Int. Cl.
  *H04L 1/1812* (2023.01)
  *H04W 72/0446* (2023.01)
  *H04W 74/08* (2009.01)

(56) References Cited

U.S. PATENT DOCUMENTS

| | | | |
|---|---|---|---|
| 2013/0039304 | A1 | 2/2013 | Pan et al. |
| 2013/0114455 | A1 | 5/2013 | Yoo et al. |
| 2014/0376424 | A1 | 12/2014 | Seo et al. |
| 2015/0003391 | A1 | 1/2015 | Chen et al. |
| 2016/0344534 | A1 | 11/2016 | Uchino et al. |
| 2017/0353931 | A1 | 12/2017 | Stern-Berkowitz et al. |
| 2022/0150934 | A1* | 5/2022 | Freda .................. H04W 72/23 |

FOREIGN PATENT DOCUMENTS

| | | |
|---|---|---|
| CN | 101883398 A | 11/2010 |
| CN | 101969697 A | 2/2011 |
| CN | 101998577 A | 3/2011 |
| CN | 102045841 A | 5/2011 |
| CN | 102065545 A | 5/2011 |
| CN | 102088303 A | 6/2011 |
| CN | 102572967 A | 7/2012 |
| CN | 103037441 A | 4/2013 |
| CN | 103260252 A | 8/2013 |
| CN | 109561505 A | 4/2019 |
| EP | 2230870 A1 | 9/2010 |
| EP | 3457801 A1 | 3/2019 |
| JP | 2013532411 A | 8/2013 |
| JP | 2014504833 A | 2/2014 |
| JP | 2015084550 A | 4/2015 |
| JP | 2015512174 A | 4/2015 |
| JP | 2016029843 A | 3/2016 |
| JP | 2016058760 A | 4/2016 |
| WO | 2009107947 A1 | 9/2009 |
| WO | 2015115197 A1 | 8/2015 |
| WO | 2015190876 A1 | 12/2015 |
| WO | 2015195792 A2 | 12/2015 |

OTHER PUBLICATIONS

"Support for SRS switching among TDD Scells," 3GPP TSG-RAN WG2 Meeting #91 bis, Malmo, Sweden, XP051004880, R2-154344, 3rd Generation Partnership Project, Valbonne, France (Oct. 5-9, 2015).

"Discussion on SRS carrier based switching," 3GPP TSG-RAN WG4 Meeting #78bis, San Jose del Cabo, MX, XP05108431,1 R4-162440, 3rd Generation Partnership Project, Valbonne, France (Apr. 11-15, 2016).

"Specification Impacts to Support SRS Carrier based Switching," 3GPP TSG RAN WG1 Meeting #84bis, Busan, Korea, R1-162586, pp. 1-4, 3rd Generation Partnership Project, Valbonne, France (Apr. 11-15, 2016).

Huawei et al., "General Operation of SRS Carrier Based Switching," 3GPP TSG RAN WG1 #84bis, Busan, Korea, R1-162585, Total 5 pages , 3rd Generation Partnership Project, Valbonne, France (Apr. 11-15, 2016).

\* cited by examiner

UPLINK INFORMATION SENDING METHOD AND APPARATUS, BASE STATION, AND USER EQUIPMENT

This application is a Continuation of U.S. patent application Ser. No. 16/301,385, filed on Nov. 13, 2018, which is a national stage of International Application No. PCT/CN2016/082153, filed on May 13, 2016. Both of the aforementioned applications are hereby incorporated by reference in its entirety.

TECHNICAL FIELD

Embodiments of the present invention relate to wireless communications technologies, and in particular, to an uplink information sending method and apparatus, a base station, and user equipment.

BACKGROUND

In an existing LTE-A (Long Term Evolution-Advanced) system, a carrier aggregation technology is introduced into LTE, to improve a transmission rate of user equipment (UE). Specifically, a plurality of carriers are aggregated into a wider carrier for transmitting data to the UE. In an LTE system, a carrier in a time division duplex (TDD) mode supports both uplink transmission and downlink transmission. UE usually has more downlink aggregatable carriers than uplink aggregatable carriers. Therefore, for one UE, there may be a case in which, on a carrier scheduled by an evolved NodeB (eNB) for the UE, only downlink transmission scheduling is performed for the UE, and no uplink transmission scheduling is performed for the UE. In the prior art, for some downlink channel measurements such as a precoding matrix indication (PMI), it is required that an uplink sounding reference signal (SRS) be sent by using a channel distinction feature based on a distinction between channels, so that an eNB performs detection to obtain a downlink channel measurement about the PMI. In this case, if the eNB requires that UE send some uplink information on the carrier, for example, the eNB requires that the UE send an uplink SRS on a carrier of a to-be-sent physical downlink shared channel (PDSCH), so as to obtain corresponding channel estimation, because the UE is not scheduled to transmit uplink data (for example, a physical uplink shared channel, PUSCH) on the carrier, no SRS can be sent on the carrier, and therefore the eNB cannot obtain the corresponding channel estimation.

A carrier switching technology is a method for resolving the foregoing problem, to ensure that the uplink information that needs to be transmitted can be transmitted on these carriers. Specifically, the eNB changes an uplink carrier configured for the UE from an original carrier to a new carrier on which the uplink information needs to be transmitted. For example, in a subframe, the carrier originally configured as the uplink carrier is not used to transmit the uplink information (for example, an SRS); instead, the new carrier on which the uplink information needs to be transmitted is configured as an uplink carrier for the UE.

However, if a carrier not configured for uplink transmission (PUSCH) needs to be used when the UE sends the uplink information, a total quantity of uplink carriers that the UE needs to use may exceed a capability of a maximum quantity of uplink aggregatable carriers of the UE. The UE cannot simultaneously transmit the to-be-transmitted uplink information (for example, the SRS), and uplink information that the eNB instructs the UE to send, for example, a PUCCH, a PUSCH, or a physical random access channel (PRACH). When such a collision occurs, UE behavior needs to be defined.

SUMMARY

Embodiments of the present invention provide an uplink information sending method, to guide UE behavior when a carrier collision occurs.

A first aspect of the present invention provides an uplink information sending method, including:

sending, by a base station, at least one of first transmission indication information of first uplink information and second transmission indication information to user equipment UE, where the first transmission indication information includes a subframe and/or a carrier on which the base station instructs the UE to send the first uplink information; and the first transmission indication information and/or the second transmission indication information are/is used to indicate UE behavior when a collision occurs.

With reference to the first aspect, in a first optional implementation of the first aspect, the collision means: in the subframe, which is indicated by the base station, of the first uplink information, a total quantity of the carrier of the first uplink information and a carrier used by second uplink information that needs to be sent by the UE exceeds an uplink carrier aggregation capability of the UE.

With reference to the first aspect or the first optional implementation of the first aspect, in a second optional implementation of the first aspect, the first uplink information is a sounding reference signal SRS, a preamble, or a sequence.

With reference to any one of the first aspect, or the first or the second optional implementation of the first aspect, in a third optional implementation of the first aspect, the first uplink information is periodic first uplink information or aperiodic first uplink information.

With reference to any one of the first aspect, or the first to the third optional implementations of the first aspect, in a fourth optional implementation of the first aspect, the second uplink information is a physical uplink control channel PUCCH, a physical uplink shared channel PUSCH, a physical random access channel PRACH, or information corresponding to the foregoing channels.

With reference to any one of the first aspect, or the first to the fourth optional implementations of the first aspect, in a fifth optional implementation of the first aspect, the second transmission indication information includes a first priority rule, and the first priority rule includes a priority of the first uplink information and a priority of the second uplink information.

With reference to the fifth optional implementation of the first aspect, in a sixth optional implementation of the first aspect, the first priority rule is used to instruct the UE to: determine, based on the first priority rule, higher-priority data from the first uplink information and the second uplink information, and send the higher-priority data.

With reference to the fifth or the sixth optional implementation of the first aspect, in a seventh optional implementation of the first aspect, the first priority rule is further used to: if the higher-priority data in the first uplink information and the second uplink information is the second uplink information, the first priority rule is further used to instruct the UE to discard the first uplink information.

With reference to any one of the fifth to the seventh optional implementations of the first aspect, in an eighth optional implementation of the first aspect, the first uplink information includes periodic first uplink information and/or aperiodic first uplink information, the second uplink information is a PRACH, a PUCCH, or a PUSCH, and the first priority rule includes at least one of the following:

a priority of the PRACH is higher than that of the aperiodic first uplink information;

the priority of the PRACH is higher than that of the periodic first uplink information;

a priority of the PUCCH is higher than that of the periodic first uplink information; and a priority of the PUSCH is higher than that of the periodic first uplink information.

With reference to the eighth optional implementation of the first aspect, in a ninth optional implementation of the first aspect, the first priority rule further includes:

a priority of a PUCCH including only channel state information CSI information is lower than that of the aperiodic first uplink information.

With reference to the eighth optional implementation of the first aspect, in a tenth optional implementation of the first aspect, the first priority rule further includes:

a priority of a PUCCH including only CSI information is higher than that of the aperiodic first uplink information.

With reference to any one of the eighth to the tenth optional implementations of the first aspect, in an eleventh optional implementation of the first aspect, the first priority rule further includes:

a priority of a PUCCH including a HARQ is higher than that of the aperiodic first uplink information.

With reference to the eighth optional implementation of the first aspect, in a twelfth optional implementation of the first aspect, the first priority rule further includes:

the priority of the PUCCH is higher than that of the aperiodic first uplink information.

With reference to any one of the eighth to the twelfth optional implementations of the first aspect, in a thirteenth optional implementation of the first aspect, the first priority rule further includes:

a priority of a PUSCH including uplink control information UCI is higher than that of the aperiodic first uplink information.

With reference to any one of the eighth to the twelfth optional implementations of the first aspect, in a fourteenth optional implementation of the first aspect, the first priority rule further includes:

a priority of a PUSCH including UCI is lower than that of the aperiodic first uplink information.

With reference to any one of the eighth to the fourteenth optional implementations of the first aspect, in a fifteenth optional implementation of the first aspect, the first priority rule further includes:

a priority of a PUSCH not including UCI is lower than that of the aperiodic first uplink information.

With reference to any one of the eighth to the fourteenth optional implementations of the first aspect, in a sixteenth optional implementation of the first aspect, the first priority rule further includes:

a priority of a PUSCH not including UCI is higher than that of the aperiodic first uplink information.

With reference to any one of the eighth to the fourteenth optional implementations of the first aspect, in a seventeenth optional implementation of the first aspect, the first priority rule further includes:

the priority of the PUSCH is higher than that of the aperiodic first uplink information.

With reference to any one of the eighth to the seventeenth optional implementations of the first aspect, in an eighteenth optional implementation of the first aspect, the first uplink information is located on a carrier of a primary cell PCell or a carrier of a secondary cell SCell.

With reference to any one of the eighth to the eighteenth optional implementations of the first aspect, in a nineteenth optional implementation of the first aspect, the second uplink information is located on the carrier of the primary cell PCell or the carrier of the secondary cell SCell.

With reference to any one of the first aspect, or the first to the third optional implementations of the first aspect, in a twentieth optional implementation of the first aspect, the first transmission indication information includes:

a first resource, where the first resource is used to indicate a subframe and/or a subframe group on which the UE sends the first uplink information, and/or, a carrier and/or a carrier group on which the UE sends the first uplink information; and/or the second transmission indication information includes:

a second priority, where the second priority is used to instruct the UE to: when the first resource belongs to a preset preferential resource set, send the first uplink information by using the first resource, and the preferential resource set includes the subframe and/or the subframe group, and/or, the carrier and/or the carrier group, on which a priority of the first uplink information is higher than a priority of the second uplink information.

With reference to any one of the first aspect, or the first to the third optional implementations of the first aspect, in a twenty-first optional implementation of the first aspect, the first transmission indication information includes:

a first resource, where the first resource is used to indicate a subframe and/or a subframe group on which the UE sends the first uplink information, and/or, a carrier and/or a carrier group on which the UE sends the first uplink information.

With reference to the twenty-first optional implementation of the first aspect, in a twenty-second optional implementation of the first aspect, the first resource belongs to a preset preferential resource set, and the preferential resource set includes the subframe and/or the subframe group, and/or, the carrier and/or the carrier group, on which a priority of the first uplink information is higher than a priority of the second uplink information.

With reference to any one of the twentieth to the twenty-second optional implementations of the first aspect, in a twenty-third optional implementation of the first aspect, the first resource and a resource used by the second uplink information satisfy a collision avoidance condition, and the collision avoidance condition is: a total quantity of carriers, used by the first uplink information and the second uplink information, in a same subframe is less than the uplink carrier aggregation capability of the UE.

With reference to the twenty-third optional implementation of the first aspect, in a twenty-fourth optional implementation of the first aspect, the resource used by the second uplink information is preconfigured, and the second uplink information includes PUCCH information, PUSCH information, or PRACH information.

With reference to any one of the first aspect, or the first to the twenty-fourth optional implementations of the first aspect, in a twenty-fifth optional implementation of the first aspect, the base station sends the first transmission indication information to the UE by using higher-layer signaling or physical-layer signaling.

With reference to any one of the first aspect, or the first to the third optional implementations of the first aspect, in a twenty-sixth optional implementation of the first aspect, the first transmission indication information includes:

a third resource, where the third resource is used to indicate a time domain resource, a frequency domain resource, and/or a space domain resource that are/is used by the UE to send the first uplink information.

With reference to any one of the first aspect, the first to the third optional implementations of the first aspect, or the twenty-sixth optional implementation of the first aspect, in a twenty-seventh optional implementation of the first aspect, the second transmission indication information includes:

a fourth resource, where the fourth resource is used to indicate a time domain resource, a frequency domain resource, and/or a space domain resource that are/is used by the UE to send the second uplink information.

With reference to the twenty-sixth optional implementation of the first aspect, in a twenty-eighth optional implementation of the first aspect, the time domain resource used by the first uplink information includes at least one of location information of the subframe occupied by the first uplink information, orthogonal frequency division multiplexing OFDM location information, cyclic shift information, and an SRS sending subframe offset.

With reference to any one of the twenty-sixth to the twenty-eighth optional implementations of the first aspect, in a twenty-ninth optional implementation of the first aspect, the time domain resource used by the second uplink information includes a time domain location of a physical resource block PRB that includes a muting area and that is used to send the second uplink information, and/or a time domain location of the muting area.

With reference to the twenty-ninth optional implementation of the first aspect, in a thirtieth optional implementation of the first aspect, the time domain location of the muting area is in an uplink pilot timeslot UpPTS physical channel.

With reference to the twenty-ninth or the thirtieth optional implementation of the first aspect, in a thirty-first optional implementation of the first aspect, the time domain location of the muting area includes a start time point and an end time point of the muting area.

With reference to any one of the twenty-sixth to the thirty-first optional implementations of the first aspect, in a thirty-second optional implementation of the first aspect, the frequency domain resource of the first uplink information includes at least one of location information of the frequency domain resource occupied by the first uplink information, information of the carrier occupied by the first uplink information, bandwidth information, and a frequency hopping configuration.

With reference to any one of the twenty-sixth to the thirty-second optional implementations of the first aspect, in a thirty-third optional implementation of the first aspect, the frequency domain resource of the second uplink information includes a frequency domain location of a PRB that includes a muting area and that is used to send the second uplink information, and/or a frequency domain location of the muting area.

With reference to any one of the twenty-sixth to the thirty-third optional implementations of the first aspect, in a thirty-fourth optional implementation of the first aspect, the space domain resource is port information.

With reference to any one of the twenty-sixth to the thirty-fourth optional implementations of the first aspect, in a thirty-fifth optional implementation of the first aspect, the first transmission indication information includes the third resource, and the base station sends the first transmission indication information by using notification signaling of the first uplink information, or the base station sends the first transmission indication information by using notification signaling of the second uplink information.

With reference to any one of the twenty-sixth to the thirty-fifth optional implementations of the first aspect, in a thirty-sixth optional implementation of the first aspect, the second transmission indication information includes the fourth resource, and the base station sends the second transmission indication information by using notification signaling of the second uplink information, or the base station sends the second transmission indication information by using notification signaling of the first uplink information.

With reference to the thirty-fifth or the thirty-sixth optional implementation of the first aspect, in a thirty-seventh optional implementation of the first aspect, a manner of configuring the notification signaling of the first uplink information is semi-static configuration, and the base station notifies the first transmission indication information and/or the second transmission indication information by using a broadcast message; or a manner of configuring the notification signaling of the first uplink information is dynamic configuration, and the base station notifies the first transmission indication information and/or the second transmission indication information by using at least one of the following signaling: dedicated signaling, higher-layer signaling, MAC signaling, and physical-layer signaling.

With reference to any one of the thirty-fifth to the thirty-seventh optional implementations of the first aspect, in a thirty-eighth optional implementation of the first aspect, a manner of configuring the notification signaling of the second uplink information is semi-static configuration, and the base station notifies the first transmission indication information and/or the second transmission indication information by using a broadcast message; or a manner of configuring the notification signaling of the second uplink information is dynamic configuration, and the base station notifies the first transmission indication information and/or the second transmission indication information by using at least one of the following signaling: dedicated signaling, higher-layer signaling, MAC signaling, and physical-layer signaling.

With reference to any one of the twenty-sixth to the thirty-eighth optional implementations of the first aspect, in a thirty-ninth optional implementation of the first aspect, the manner of configuring the notification signaling of the first uplink information is the dynamic configuration, and the base station sends the first transmission indication information and/or the second transmission indication information to the UE by using extended uplink grant signaling or uplink scheduling signaling.

With reference to any one of the twenty-sixth to the thirty-eighth optional implementations of the first aspect, in a fortieth optional implementation of the first aspect, the base station sends the first transmission indication information and/or the second transmission indication information to the UE by using extended downlink control information DCI.

With reference to the fortieth optional implementation of the first aspect, in a forty-first optional implementation of the first aspect, a type of the DCI is used to instruct to: send the second uplink information by using the physical resource block PRB including the muting area.

With reference to any one of the twenty-sixth to the forty-first optional implementations of the first aspect, in a forty-second optional implementation of the first aspect, the second uplink information includes a PUCCH; the base station indicates, in the notification signaling of the second uplink information, the first transmission indication information; and the manner of configuring the notification signaling of the second uplink information is the semi-static configuration.

With reference to any one of the twenty-sixth to the forty-second optional implementations of the first aspect, in a forty-third optional implementation of the first aspect, the first transmission indication information includes a carrier identifier of the first uplink information, and/or the second transmission indication information includes a carrier identifier of the second uplink information. A second aspect of the present invention provides an uplink signal sending method, including:

receiving, by user equipment UE, at least one of first transmission indication information of first uplink information and/or second transmission indication information that are/is sent by a base station, where the first transmission indication information includes a subframe and/or a carrier on which the base station instructs the UE to send the first uplink information; and determining, by the UE based on the first transmission indication information and/or the second transmission indication information, UE behavior when a carrier collision occurs.

With reference to the second aspect, in a first optional implementation of the second aspect, the collision means: in the subframe, which is indicated by the base station, of the first uplink information, a total quantity of the carrier of the first uplink information and a carrier used by second uplink information that needs to be sent by the UE exceeds an uplink carrier aggregation capability of the UE.

With reference to the second aspect or the first optional implementation of the second aspect, in a second optional implementation of the second aspect, the first uplink information is a sounding reference signal SRS, a preamble, or a sequence.

With reference to any one of the second aspect, or the first or the second optional implementation of the second aspect, in a third optional implementation of the second aspect, the first uplink information is periodic first uplink information or aperiodic first uplink information.

With reference to any one of the second aspect, or the first to the third optional implementations of the second aspect, in a fourth optional implementation of the second aspect, the second uplink information is a physical uplink control channel PUCCH, a physical uplink shared channel PUSCH, a physical random access channel PRACH, or information corresponding to the foregoing channels.

With reference to any one of the second aspect, or the first to the fourth optional implementations of the second aspect, in a fifth optional implementation of the second aspect, the second transmission indication information includes a first priority rule, and the first priority rule includes a priority of the first uplink information and a priority of the second uplink information.

With reference to the fifth optional implementation of the second aspect, in a sixth optional implementation of the second aspect, the UE sends higher-priority data, and the higher-priority data is determined from the first uplink information and the second uplink information based on the first priority rule.

With reference to the fifth or the sixth optional implementation of the second aspect, in a seventh optional implementation of the second aspect, the higher-priority data in the first uplink information and the second uplink information is the second uplink information, and the UE discards the first uplink information.

With reference to any one of the fifth to the seventh optional implementations of the second aspect, in an eighth optional implementation of the second aspect, the first uplink information includes periodic first uplink information and aperiodic first uplink information, the second uplink information is a PRACH, a PUCCH, or a PUSCH, and the first priority rule includes at least one of the following:

a priority of the PRACH is higher than that of the aperiodic first uplink information;

the priority of the PRACH is higher than that of the periodic first uplink information;

a priority of the PUCCH is higher than that of the periodic first uplink information; and a priority of the PUSCH is higher than that of the periodic first uplink information.

With reference to the eighth optional implementation of the second aspect, in a ninth optional implementation of the second aspect, the first priority rule further includes:

a priority of a PUCCH including only channel state information CSI information is lower than that of the aperiodic first uplink information.

With reference to the eighth optional implementation of the second aspect, in a tenth optional implementation of the second aspect, the first priority rule further includes:

a priority of a PUCCH including only CSI information is higher than that of the aperiodic first uplink information.

With reference to any one of the eighth to the tenth optional implementations of the second aspect, in an eleventh optional implementation of the second aspect, the first priority rule further includes:

a priority of a PUCCH including a HARQ is higher than that of the aperiodic first uplink information.

With reference to the eighth optional implementation of the second aspect, in a twelfth optional implementation of the second aspect, the first priority rule further includes:

the priority of the PUCCH is higher than that of the aperiodic first uplink information.

With reference to any one of the eighth to the twelfth optional implementations of the second aspect, in a thirteenth optional implementation of the second aspect, the first priority rule further includes:

a priority of a PUSCH including uplink control information UCI is higher than that of an aperiodic SRS.

With reference to any one of the eighth to the twelfth optional implementations of the second aspect, in a fourteenth optional implementation of the second aspect, the first priority rule further includes:

a priority of a PUSCH including UCI is lower than that of an aperiodic SRS.

With reference to any one of the eighth to the fourteenth optional implementations of the second aspect, in a fifteenth optional implementation of the second aspect, the first priority rule further includes:

a priority of a PUSCH not including UCI is lower than that of the aperiodic first uplink information.

With reference to any one of the eighth to the fourteenth optional implementations of the second aspect, in a sixteenth optional implementation of the second aspect, the first priority rule further includes:

a priority of a PUSCH not including UCI is higher than that of the aperiodic first uplink information.

With reference to any one of the eighth to the fourteenth optional implementations of the second aspect, in a seventeenth optional implementation of the second aspect, the first priority rule further includes:

the priority of the PUSCH is higher than that of the aperiodic SRS.

With reference to any one of the eighth to the seventeenth optional implementations of the second aspect, in an eighteenth optional implementation of the second aspect, the first uplink information is located on a carrier of a primary cell PCell or a carrier of a secondary cell SCell.

With reference to any one of the eighth to the eighteenth optional implementations of the second aspect, in a nineteenth optional implementation of the second aspect, the second uplink information is located on the carrier of the primary cell PCell or the carrier of the secondary cell SCell.

With reference to any one of the second aspect, or the first to the fourth optional implementations of the second aspect, in a twentieth optional implementation of the second aspect, the second transmission indication information includes a first resource, where the first resource is used to indicate a subframe and/or a subframe group on which the UE sends the first uplink information, and/or, a carrier and/or a carrier group on which the UE sends the first uplink information;

the second transmission indication information includes a second priority, where the second priority is used to indicate a preset preferential resource set, and the first resource belongs to the preset preferential resource set; and the UE sends the first uplink information by using the first resource.

With reference to any one of the second aspect, or the first to the fourth optional implementations of the second aspect, in a twenty-first optional implementation of the second aspect, the first transmission indication information includes:

a first resource, where the first resource is used to indicate a subframe and/or a subframe group on which the UE sends the first uplink information, and/or, a carrier and/or a carrier group on which the UE sends the first uplink information; and the UE sends the first uplink information by using the first resource.

With reference to the twenty-first optional implementation of the second aspect, in a twenty-second optional implementation of the second aspect, the first resource belongs to a preset preferential resource set, and the preferential resource set includes the subframe and/or the subframe group, and/or, the carrier and/or the carrier group, on which a priority of the first uplink information is higher than a priority of the second uplink information.

With reference to any one of the twentieth to the twenty-second optional implementations of the second aspect, in a twenty-third optional implementation of the second aspect, the first resource and a resource used by the second uplink information satisfy a carrier collision avoidance condition, and the carrier collision avoidance condition is: a total quantity of carriers, used by the first uplink information and the second uplink information, in a same subframe is less than the uplink carrier aggregation capability of the UE.

With reference to the twenty-third optional implementation of the second aspect, in a twenty-fourth optional implementation of the second aspect, the resource used by the second uplink information is preconfigured, and the second uplink information includes PUCCH information, PUSCH information, or PRACH information.

With reference to any one of the second aspect, or the first to the twenty-fourth optional implementations of the second aspect, in a twenty-fifth optional implementation of the second aspect, the UE receives, by using higher-layer signaling or physical-layer signaling, the first transmission indication information sent by the base station.

With reference to any one of the second aspect, or the first to the fourth optional implementations of the second aspect, in a twenty-sixth optional implementation of the second aspect, the first transmission indication information includes a third resource, where the third resource is used to indicate a time domain resource, a frequency domain resource, and/or a space domain resource that are/is used by the UE to send the first uplink information, and the UE sends the first uplink information and/or the second uplink information based on the third resource; and/or the second transmission indication information includes a fourth resource, where the fourth resource is used to indicate a time domain resource, a frequency domain resource, and/or a space domain resource that are/is used by the UE to send the second uplink information, and the UE sends the first uplink information and/or the second uplink information based on the fourth resource.

With reference to the twenty-sixth optional implementation of the second aspect, in a twenty-seventh optional implementation of the second aspect, that the UE sends the first uplink information and/or the second uplink information based on the third resource includes:

sending, by the UE, the first uplink information on the third resource, and skipping sending the second uplink information on a corresponding time domain resource of a carrier that is subject to a carrier collision with the third resource, where the corresponding time domain resource of the carrier that is subject to the carrier collision with the third resource is the same as the time domain resource of the third resource.

With reference to the twenty-sixth optional implementation of the second aspect, in a twenty-eighth optional implementation of the second aspect, that the UE sends the first uplink information and/or the second uplink information based on the fourth resource includes:

sending, by the UE, the second uplink information on the fourth resource, and sending the first uplink information on a corresponding time domain resource of a carrier that is subject to a carrier collision with the fourth resource, where the corresponding time domain resource of the carrier that is subject to the carrier collision with the fourth resource is different from the time domain resource of the fourth resource.

With reference to any one of the twenty-sixth to the twenty-eighth optional implementations of the second aspect, in a twenty-ninth optional implementation of the second aspect, the time domain resource used by the first uplink information includes at least one of location information of the subframe occupied by the first uplink information, orthogonal frequency division multiplexing OFDM location information, cyclic shift information, and an SRS sending subframe offset.

With reference to any one of the twenty-sixth to the twenty-ninth optional implementations of the second aspect, in a thirtieth optional implementation of the second aspect, the time domain resource used by the second uplink information includes a time domain location of a physical resource block PRB that includes a muting area and that is used to send the second uplink information, and/or a time domain location of the muting area; and the UE does not send the second uplink information in the time domain location of the PRB that includes the muting area and that is used to send the second uplink information.

With reference to the thirtieth optional implementation of the second aspect, in a thirty-first optional implementation of the second aspect, the time domain location of the muting area includes a start time point and an end time point of the muting area.

With reference to any one of the twenty-sixth to the thirty-first optional implementations of the second aspect, in a thirty-second optional implementation of the second aspect, the frequency domain resource of the first uplink information includes at least one of location information of the frequency domain resource occupied by the first uplink information, information of the carrier occupied by the first uplink information, bandwidth information, and a frequency hopping configuration.

With reference to any one of the twenty-sixth to the thirty-second optional implementations of the second aspect, in a thirty-third optional implementation of the second aspect, the frequency domain resource of the second uplink information includes a frequency domain location of a PRB that includes a muting area and that is used to send the second uplink information, and/or a frequency domain location of the muting area.

With reference to any one of the twenty-sixth to the thirty-third optional implementations of the second aspect, in a thirty-fourth optional implementation of the second aspect, the space domain resource is port information.

With reference to any one of the twenty-sixth to the thirty-fourth optional implementations of the second aspect, in a thirty-fifth optional implementation of the second aspect, the first transmission indication information includes the third resource, and the UE receives the first transmission indication information by using notification signaling of the first uplink information, or the UE receives the first transmission indication information by using notification signaling of the second uplink information.

With reference to any one of the twenty-sixth to the thirty-fifth optional implementations of the second aspect, in a thirty-sixth optional implementation of the second aspect, the second transmission indication information includes the fourth resource, and the UE receives the second transmission indication information by using notification signaling of the second uplink information, or the UE receives the second transmission indication information by using notification signaling of the first uplink information.

With reference to the thirty-fifth or the thirty-sixth optional implementation of the second aspect, in a thirty-seventh optional implementation of the second aspect, a manner of configuring the notification signaling of the first uplink information is semi-static configuration, and the UE receives the first transmission indication information and/or the second transmission indication information by using a broadcast message; or a manner of configuring the notification signaling of the first uplink information is dynamic configuration, and the UE receives the first transmission indication information and/or the second transmission indication information by using at least one of the following signaling: dedicated signaling, higher-layer signaling, MAC signaling, and physical-layer signaling.

With reference to any one of the thirty-fifth to the thirty-seventh optional implementations of the second aspect, in a thirty-eighth optional implementation of the second aspect, a manner of configuring the notification signaling of the second uplink information is semi-static configuration, and the UE receives the first transmission indication information and/or the second transmission indication information by using a broadcast message; or a manner of configuring the notification signaling of the second uplink information is dynamic configuration, and the UE receives the first transmission indication information and/or the second transmission indication information by using at least one of the following signaling: dedicated signaling, higher-layer signaling, MAC signaling, and physical-layer signaling.

With reference to any one of the thirty-fifth to the thirty-eighth optional implementations of the second aspect, in a thirty-ninth optional implementation of the second aspect, the manner of configuring the notification signaling of the first uplink information is the dynamic configuration, and the UE receives the first transmission indication information and/or the second transmission indication information by using uplink grant signaling or uplink scheduling signaling.

With reference to any one of the thirty-fifth to the thirty-ninth optional implementations of the second aspect, in a fortieth optional implementation of the second aspect, the UE receives the first transmission indication information and/or the second transmission indication information by using downlink control information DCI.

With reference to the fortieth optional implementation of the second aspect, in a forty-first optional implementation of the second aspect, a type of the DCI is used to instruct to: send the second uplink information by using the physical resource block PRB including the muting area.

With reference to any one of the thirty-fifth to the forty-first optional implementations of the second aspect, in a forty-second optional implementation of the second aspect, the second uplink information includes a PUCCH, the UE receives the first transmission indication information by using the notification signaling of the second uplink information, and the manner of configuring the notification signaling of the second uplink information is the semi-static configuration.

With reference to any one of the thirty-fifth to the forty-second optional implementations of the second aspect, in a forty-second optional implementation of the second aspect, the first transmission indication information includes a carrier identifier of the first uplink information, and/or the second transmission indication information includes a carrier identifier of the second uplink information.

A third aspect of the present invention provides an uplink information sending apparatus, including:

a sending module, configured to send at least one of first transmission indication information of first uplink information and second transmission indication information to user equipment UE, where the first transmission indication information includes a subframe and/or a carrier on which the base station instructs the UE to send the first uplink information; and the first transmission indication information and/or the second transmission indication information are/is used to indicate UE behavior when a collision occurs.

With reference to the third aspect, in a first optional implementation of the third aspect, the collision means: in the subframe, which is indicated by the base station, of the first uplink information, a total quantity of the carrier of the first uplink information and a carrier used by second uplink information that needs to be sent by the UE exceeds an uplink carrier aggregation capability of the UE.

With reference to the third aspect or the first optional implementation of the third aspect, in a second optional implementation of the third aspect, the first uplink information is a sounding reference signal SRS, a preamble, or a sequence.

With reference to any one of the third aspect, or the first or the second optional implementation of the third aspect, in a third optional implementation of the third aspect, the first uplink information is periodic first uplink information or aperiodic first uplink information.

With reference to any one of the third aspect, or the first to the third optional implementations of the third aspect, in a fourth optional implementation of the third aspect, the second uplink information is a physical uplink control channel PUCCH, a physical uplink shared channel PUSCH, a physical random access channel PRACH, or information corresponding to the foregoing channels.

With reference to any one of the third aspect, or the first to the fourth optional implementations of the third aspect, in a fifth optional implementation of the third aspect, the second transmission indication information includes a first priority rule, and the first priority rule includes a priority of the first uplink information and a priority of the second uplink information.

With reference to the fifth optional implementation of the third aspect, in a sixth optional implementation of the third aspect, the first priority rule is used to instruct the UE to: determine, based on the first priority rule, higher-priority data from the first uplink information and the second uplink information, and send the higher-priority data.

With reference to the fifth or the sixth optional implementation of the third aspect, in a seventh optional implementation of the third aspect, the first priority rule is further used to: if the higher-priority data in the first uplink information and the second uplink information is the second uplink information, the first priority rule is further used to instruct the UE to discard the first uplink information.

With reference to any one of the fifth to the seventh optional implementations of the third aspect, in an eighth optional implementation of the third aspect, the first uplink information includes periodic first uplink information and/or aperiodic first uplink information, the second uplink information is a PRACH, a PUCCH, or a PUSCH, and the first priority rule includes at least one of the following:

a priority of the PRACH is higher than that of the aperiodic first uplink information;

the priority of the PRACH is higher than that of the periodic first uplink information;

a priority of the PUCCH is higher than that of the periodic first uplink information; and a priority of the PUSCH is higher than that of the periodic first uplink information.

With reference to the eighth optional implementation of the third aspect, in a ninth optional implementation of the third aspect, the first priority rule further includes:

a priority of a PUCCH including only channel state information CSI information is lower than that of the aperiodic first uplink information.

With reference to the eighth optional implementation of the third aspect, in a tenth optional implementation of the third aspect, the first priority rule further includes:

a priority of a PUCCH including only CSI information is higher than that of the aperiodic first uplink information.

With reference to any one of the eighth to the tenth optional implementations of the third aspect, in an eleventh optional implementation of the third aspect, the first priority rule further includes:

a priority of a PUCCH including a HARQ is higher than that of the aperiodic first uplink information.

With reference to the eighth optional implementation of the third aspect, in a twelfth optional implementation of the third aspect, the first priority rule further includes:

the priority of the PUCCH is higher than that of the aperiodic first uplink information.

With reference to any one of the eighth to the twelfth optional implementations of the third aspect, in a thirteenth optional implementation of the third aspect, the first priority rule further includes:

a priority of a PUSCH including uplink control information UCI is higher than that of the aperiodic first uplink information.

With reference to any one of the eighth to the twelfth optional implementations of the third aspect, in a fourteenth optional implementation of the third aspect, the first priority rule further includes:

a priority of a PUSCH including UCI is lower than that of the aperiodic first uplink information.

With reference to any one of the eighth to the fourteenth optional implementations of the third aspect, in a fifteenth optional implementation of the third aspect, the first priority rule further includes:

a priority of a PUSCH not including UCI is lower than that of the aperiodic first uplink information.

With reference to any one of the eighth to the fourteenth optional implementations of the third aspect, in a sixteenth optional implementation of the third aspect, the first priority rule further includes:

a priority of a PUSCH not including UCI is higher than that of the aperiodic first uplink information.

With reference to any one of the eighth to the fourteenth optional implementations of the third aspect, in a seventeenth optional implementation of the third aspect, the first priority rule further includes:

the priority of the PUSCH is higher than that of the aperiodic first uplink information.

With reference to any one of the eighth to the seventeenth optional implementations of the third aspect, in an eighteenth optional implementation of the third aspect, the first uplink information is located on a carrier of a primary cell PCell or a carrier of a secondary cell SCell.

With reference to any one of the eighth to the eighteenth optional implementations of the third aspect, in a nineteenth optional implementation of the third aspect, the second uplink information is located on the carrier of the primary cell PCell or the carrier of the secondary cell SCell.

With reference to any one of the third aspect, or the first to the third optional implementations of the third aspect, in a twentieth optional implementation of the third aspect, the first transmission indication information includes:

a first resource, where the first resource is used to indicate a subframe and/or a subframe group on which the UE sends the first uplink information, and/or, a carrier and/or a carrier group on which the UE sends the first uplink information; and/or the second transmission indication information includes:

a second priority, where the second priority is used to instruct the UE to: when the first resource belongs to a preset preferential resource set, send the first uplink information by using the first resource, and the preferential resource set includes the subframe and/or the subframe group, and/or, the carrier and/or the carrier group, on which a priority of the first uplink information is higher than a priority of the second uplink information.

With reference to any one of the third aspect, or the first to the third optional implementations of the third aspect, in a twenty-first optional implementation of the third aspect, the first transmission indication information includes:

a first resource, where the first resource is used to indicate a subframe and/or a subframe group on which the UE sends the first uplink information, and/or, a carrier and/or a carrier group on which the UE sends the first uplink information.

With reference to the twenty-first optional implementation of the third aspect, in a twenty-second optional implementation of the third aspect, the first resource belongs to a preset preferential resource set, and the preferential resource set includes the subframe and/or the subframe group, and/or, the carrier and/or the carrier group, on which a priority of the first uplink information is higher than a priority of the second uplink information.

With reference to any one of the twentieth to the twenty-second optional implementations of the third aspect, in a twenty-third optional implementation of the third aspect, the first resource and a resource used by the second uplink information satisfy a collision avoidance condition, and the collision avoidance condition is: a total quantity of carriers, used by the first uplink information and the second uplink information, in a same subframe is less than the uplink carrier aggregation capability of the UE.

With reference to the twenty-third optional implementation of the third aspect, in a twenty-fourth optional implementation of the third aspect, the resource used by the second uplink information is preconfigured, and the second uplink information includes PUCCH information, PUSCH information, or PRACH information.

With reference to any one of the third aspect, or the first to the twenty-fourth optional implementations of the third aspect, in a twenty-fifth optional implementation of the third aspect, the sending module is configured to send the first transmission indication information to the UE by using higher-layer signaling or physical-layer signaling.

With reference to any one of the third aspect, or the first to the third optional implementations of the third aspect, in a twenty-sixth optional implementation of the third aspect, the first transmission indication information includes:

a third resource, where the third resource is used to indicate a time domain resource, a frequency domain resource, and/or a space domain resource that are/is used by the UE to send the first uplink information.

With reference to any one of the third aspect, the first to the third optional implementations of the third aspect, or the twenty-sixth optional implementation of the third aspect, in a twenty-seventh optional implementation of the third aspect, the second transmission indication information includes:

a fourth resource, where the fourth resource is used to indicate a time domain resource, a frequency domain resource, and/or a space domain resource that are/is used by the UE to send the second uplink information.

With reference to the twenty-sixth optional implementation of the third aspect, in a twenty-eighth optional implementation of the third aspect, the time domain resource used by the first uplink information includes at least one of location information of the subframe occupied by the first uplink information, orthogonal frequency division multiplexing OFDM location information, cyclic shift information, and an SRS sending subframe offset.

With reference to any one of the twenty-sixth to the twenty-eighth optional implementations of the third aspect, in a twenty-ninth optional implementation of the third aspect, the time domain resource used by the second uplink information includes a time domain location of a physical resource block PRB that includes a muting area and that is used to send the second uplink information, and/or a time domain location of the muting area.

With reference to the twenty-ninth optional implementation of the third aspect, in a thirtieth optional implementation of the third aspect, the time domain location of the muting area is in an uplink pilot timeslot UpPTS physical channel.

With reference to the twenty-ninth or the thirtieth optional implementation of the third aspect, in a thirty-first optional implementation of the third aspect, the time domain location of the muting area includes a start time point and an end time point of the muting area.

With reference to any one of the twenty-sixth to the thirty-first optional implementations of the third aspect, in a thirty-second optional implementation of the third aspect, the frequency domain resource of the first uplink information includes at least one of location information of the frequency domain resource occupied by the first uplink information, information of the carrier occupied by the first uplink information, bandwidth information, and a frequency hopping configuration.

With reference to any one of the twenty-sixth to the thirty-second optional implementations of the third aspect, in a thirty-third optional implementation of the third aspect, the frequency domain resource of the second uplink information includes a frequency domain location of a PRB that includes a muting area and that is used to send the second uplink information, and/or a frequency domain location of the muting area.

With reference to any one of the twenty-sixth to the thirty-fourth optional implementations of the third aspect, in a thirty-fifth optional implementation of the third aspect, the space domain resource is port information.

With reference to any one of the twenty-sixth to the thirty-fifth optional implementations of the third aspect, in a thirty-sixth optional implementation of the third aspect, the first transmission indication information includes the third resource, and the sending module is configured to send the first transmission indication information by using notification signaling of the first uplink information, or the sending module is configured to send the first transmission indication information by using notification signaling of the second uplink information.

With reference to any one of the twenty-sixth to the thirty-fifth optional implementations of the third aspect, in a thirty-sixth optional implementation of the third aspect, the second transmission indication information includes the fourth resource, and the sending module is configured to send the second transmission indication information by using notification signaling of the second uplink information, or the sending module is configured to send the second transmission indication information by using notification signaling of the first uplink information.

With reference to the thirty-fifth or the thirty-sixth optional implementation of the third aspect, in a thirty-seventh optional implementation of the third aspect, a manner of configuring the notification signaling of the first uplink information is semi-static configuration, and the sending module is configured to notify the first transmission indication information and/or the second transmission indication information by using a broadcast message; or a manner of configuring the notification signaling of the first uplink information is dynamic configuration, and the sending module is configured to notify the first transmission indication information and/or the second transmission indication information by using at least one of the following signaling: dedicated signaling, higher-layer signaling, MAC signaling, and physical-layer signaling.

With reference to any one of the thirty-fifth to the thirty-seventh optional implementations of the third aspect, in a thirty-eighth optional implementation of the third aspect, a manner of configuring the notification signaling of the second uplink information is semi-static configuration, and the sending module is configured to notify the first transmission indication information and/or the second transmission indication information by using a broadcast message; or a manner of configuring the notification signaling of the second uplink information is dynamic configuration, and the sending module is configured to notify the first transmission indication information and/or the second transmission indication information by using at least one of the following signaling: dedicated signaling, higher-layer signaling, MAC signaling, and physical-layer signaling.

With reference to any one of the twenty-sixth to the thirty-eighth optional implementations of the third aspect, in a thirty-ninth optional implementation of the third aspect, the manner of configuring the notification signaling of the first uplink information is the dynamic configuration, and the sending module is configured to send the first transmission indication information and/or the second transmission indication information to the UE by using extended uplink grant signaling or uplink scheduling signaling.

With reference to any one of the twenty-sixth to the thirty-eighth optional implementations of the third aspect, in a fortieth optional implementation of the third aspect, the sending module is configured to send the first transmission indication information and/or the second transmission indication information to the UE by using extended downlink control information DCI.

With reference to the fortieth optional implementation of the third aspect, in a forty-first optional implementation of the third aspect, a type of the DCI is used to instruct to: send the second uplink information by using the physical resource block PRB including the muting area.

With reference to any one of the twenty-sixth to the forty-first optional implementations of the third aspect, in a forty-second optional implementation of the third aspect, the second uplink information includes a PUCCH; the sending module is configured to indicate, in the notification signaling of the second uplink information, the first transmission indication information; and the manner of configuring the notification signaling of the second uplink information is the semi-static configuration.

With reference to any one of the twenty-sixth to the forty-second optional implementations of the third aspect, in a forty-third optional implementation of the third aspect, the first transmission indication information includes a carrier identifier of the first uplink information, and/or the second transmission indication information includes a carrier identifier of the second uplink information.

A fourth aspect of the present invention provides an uplink signal sending apparatus, including:

a receiving module, configured to receive at least one of first transmission indication information of first uplink information and/or second transmission indication information that are/is sent by a base station, where the first transmission indication information includes a subframe and/or a carrier on which the base station instructs user equipment UE to send the first uplink information; and a processing module, configured to determine, based on the first transmission indication information and/or the second transmission indication information, UE behavior when a collision occurs.

With reference to the fourth aspect, in a first optional implementation of the fourth aspect, the collision means: in the subframe, which is indicated by the base station, of the first uplink information, a total quantity of the carrier of the first uplink information and a carrier used by second uplink information that needs to be sent by the UE exceeds an uplink carrier aggregation capability of the UE.

With reference to the fourth aspect or the first optional implementation of the fourth aspect, in a second optional implementation of the fourth aspect, the first uplink information is a sounding reference signal SRS, a preamble, or a sequence.

With reference to any one of the fourth aspect, or the first or the second optional implementation of the fourth aspect, in a third optional implementation of the fourth aspect, the first uplink information is periodic first uplink information or aperiodic first uplink information.

With reference to any one of the fourth aspect, or the first to the third optional implementations of the fourth aspect, in a fourth optional implementation of the fourth aspect, the second uplink information is a physical uplink control channel PUCCH, a physical uplink shared channel PUSCH, a physical random access channel PRACH, or information corresponding to the foregoing channels.

With reference to any one of the fourth aspect, or the first to the fourth optional implementations of the fourth aspect, in a fifth optional implementation of the fourth aspect, the second transmission indication information includes a first priority rule, and the first priority rule includes a priority of the first uplink information and a priority of the second uplink information.

With reference to the fifth optional implementation of the fourth aspect, in a sixth optional implementation of the fourth aspect, the apparatus further includes:

a transmit module, configured to send higher-priority data, where the higher-priority data is determined from the first uplink information and the second uplink information based on the first priority rule.

With reference to the fifth or the sixth optional implementation of the fourth aspect, in a seventh optional implementation of the fourth aspect, the processing module is further configured to discard the first uplink information, and the higher-priority data in the first uplink information and the second uplink information is the second uplink information.

With reference to any one of the fifth to the seventh optional implementations of the fourth aspect, in an eighth optional implementation of the fourth aspect, the first uplink information includes periodic first uplink information and aperiodic first uplink information, the second uplink information is a PRACH, a PUCCH, or a PUSCH, and the first priority rule includes at least one of the following:

a priority of the PRACH is higher than that of the aperiodic first uplink information;

the priority of the PRACH is higher than that of the periodic first uplink information;

a priority of the PUCCH is higher than that of the periodic first uplink information; and a priority of the PUSCH is higher than that of the periodic first uplink information.

With reference to the eighth optional implementation of the fourth aspect, in a ninth optional implementation of the fourth aspect, the first priority rule further includes:

a priority of a PUCCH including only channel state information CSI information is lower than that of the aperiodic first uplink information.

With reference to the eighth optional implementation of the fourth aspect, in a tenth optional implementation of the fourth aspect, the first priority rule further includes:

a priority of a PUCCH including only CSI information is higher than that of the aperiodic first uplink information.

With reference to any one of the eighth to the tenth optional implementations of the fourth aspect, in an eleventh optional implementation of the fourth aspect, the first priority rule further includes:

a priority of a PUCCH including a HARQ is higher than that of the aperiodic first uplink information.

With reference to the eighth optional implementation of the fourth aspect, in a twelfth optional implementation of the fourth aspect, the first priority rule further includes:

the priority of the PUCCH is higher than that of the aperiodic first uplink information.

With reference to any one of the eighth to the twelfth optional implementations of the fourth aspect, in a thirteenth optional implementation of the fourth aspect, the first priority rule further includes:

a priority of a PUSCH including uplink control information UCI is higher than that of an aperiodic SRS.

With reference to any one of the eighth to the twelfth optional implementations of the fourth aspect, in a fourteenth optional implementation of the fourth aspect, the first priority rule further includes:

a priority of a PUSCH including UCI is lower than that of an aperiodic SRS.

With reference to any one of the eighth to the fourteenth optional implementations of the fourth aspect, in a fifteenth optional implementation of the fourth aspect, the first priority rule further includes:

a priority of a PUSCH not including UCI is lower than that of the aperiodic first uplink information.

With reference to any one of the eighth to the fourteenth optional implementations of the fourth aspect, in a sixteenth optional implementation of the fourth aspect, the first priority rule further includes:

a priority of a PUSCH not including UCI is higher than that of the aperiodic first uplink information.

With reference to any one of the eighth to the fourteenth optional implementations of the fourth aspect, in a seventeenth optional implementation of the fourth aspect, the first priority rule further includes:

the priority of the PUSCH is higher than that of the aperiodic SRS.

With reference to any one of the eighth to the seventeenth optional implementations of the fourth aspect, in an eighteenth optional implementation of the fourth aspect, the first uplink information is located on a carrier of a primary cell PCell or a carrier of a secondary cell SCell.

With reference to any one of the eighth to the eighteenth optional implementations of the fourth aspect, in a nineteenth optional implementation of the fourth aspect, the second uplink information is located on the carrier of the primary cell PCell or the carrier of the secondary cell SCell.

With reference to any one of the fourth aspect, or the first to the fourth optional implementations of the fourth aspect, in a twentieth optional implementation of the fourth aspect, the second transmission indication information includes a first resource, where the first resource is used to indicate a subframe and/or a subframe group on which the UE sends the first uplink information, and/or, a carrier and/or a carrier group on which the UE sends the first uplink information;

the second transmission indication information includes a second priority, where the second priority is used to indicate a preset preferential resource set, and the first resource belongs to the preset preferential resource set; and the transmit module is further configured to send the first uplink information by using the first resource.

With reference to any one of the fourth aspect, or the first to the fourth optional implementations of the fourth aspect, in a twenty-first optional implementation of the fourth aspect, the first transmission indication information includes:

a first resource, where the first resource is used to indicate a subframe and/or a subframe group on which the UE sends the first uplink information, and/or, a carrier and/or a carrier group on which the UE sends the first uplink information; and the transmit module is further configured to send the first uplink information by using the first resource.

With reference to the twenty-first optional implementation of the fourth aspect, in a twenty-second optional implementation of the fourth aspect, the first resource belongs to a preset preferential resource set, and the preferential resource set includes the subframe and/or the subframe group, and/or, the carrier and/or the carrier group, on which a priority of the first uplink information is higher than a priority of the second uplink information.

With reference to any one of the twentieth to the twenty-second optional implementations of the fourth aspect, in a twenty-third optional implementation of the fourth aspect, the first resource and a resource used by the second uplink information satisfy a carrier collision avoidance condition, and the carrier collision avoidance condition is: a total quantity of carriers, used by the first uplink information and the second uplink information, in a same subframe is less than the uplink carrier aggregation capability of the UE.

With reference to the twenty-third optional implementation of the fourth aspect, in a twenty-fourth optional implementation of the fourth aspect, the resource used by the second uplink information is preconfigured, and the second uplink information includes PUCCH information, PUSCH information, or PRACH information.

With reference to any one of the fourth aspect, or the first to the twenty-fourth optional implementations of the fourth aspect, in a twenty-fifth optional implementation of the fourth aspect, the receiving module is further configured to receive, for the UE by using higher-layer signaling or physical-layer signaling, the first transmission indication information sent by the base station.

With reference to any one of the fourth aspect, or the first to the fourth optional implementations of the fourth aspect, in a twenty-sixth optional implementation of the fourth aspect, the first transmission indication information includes a third resource, where the third resource is used to indicate a time domain resource, a frequency domain resource, and/or a space domain resource that are/is used by the UE to send the first uplink information, and the transmit module is configured to send the first uplink information and/or the second uplink information based on the third resource; and/or the second transmission indication information includes a fourth resource, where the fourth resource is used to indicate a time domain resource, a frequency domain resource, and/or a space domain resource that are/is used by the UE to send the second uplink information, and the transmit module is configured to send the first uplink information and/or the second uplink information based on the fourth resource.

With reference to the twenty-sixth optional implementation of the fourth aspect, in a twenty-seventh optional implementation of the fourth aspect, the transmit module is configured to: send the first uplink information on the third resource, and skip sending the second uplink information on a corresponding time domain resource of a carrier that is subject to a carrier collision with the third resource, where the corresponding time domain resource of the carrier that is subject to the carrier collision with the third resource is the same as the time domain resource of the third resource.

With reference to the twenty-sixth optional implementation of the fourth aspect, in a twenty-eighth optional implementation of the fourth aspect, the transmit module is configured to: send the second uplink information on the fourth resource, and send the first uplink information on a corresponding time domain resource of a carrier that is subject to a carrier collision with the fourth resource, where the corresponding time domain resource of the carrier that is subject to the carrier collision with the fourth resource is different from the time domain resource of the fourth resource.

With reference to the twenty-sixth optional implementation of the fourth aspect, in a twenty-eighth optional implementation of the fourth aspect, the time domain resource used by the first uplink information includes at least one of location information of the subframe occupied by the first uplink information, orthogonal frequency division multiplexing OFDM location information, cyclic shift information, and an SRS sending subframe offset.

With reference to any one of the twenty-sixth to the twenty-ninth optional implementations of the fourth aspect, in a thirtieth optional implementation of the fourth aspect, the time domain resource used by the second uplink information includes a time domain location of a physical resource block PRB that includes a muting area and that is used to send the second uplink information, and/or a time domain location of the muting area; and the transmit module is configured to skip sending the second uplink information in the time domain location of the PRB that includes the muting area and that is used to send the second uplink information.

With reference to the thirtieth optional implementation of the fourth aspect, in a thirty-first optional implementation of the fourth aspect, the time domain location of the muting area includes a start time point and an end time point of the muting area.

With reference to any one of the twenty-sixth to the thirty-first optional implementations of the fourth aspect, in a thirty-second optional implementation of the fourth aspect, the frequency domain resource of the first uplink information includes at least one of location information of the frequency domain resource occupied by the first uplink information, information of the carrier occupied by the first uplink information, bandwidth information, and a frequency hopping configuration.

With reference to any one of the twenty-sixth to the thirty-second optional implementations of the fourth aspect, in a thirty-third optional implementation of the fourth aspect, the frequency domain resource of the second uplink information includes a frequency domain location of a PRB that includes a muting area and that is used to send the second uplink information, and/or a frequency domain location of the muting area.

With reference to any one of the twenty-sixth to the thirty-third optional implementations of the fourth aspect, in a thirty-fourth optional implementation of the fourth aspect, the space domain resource is port information.

With reference to any one of the twenty-sixth to the thirty-fourth optional implementations of the fourth aspect, in a thirty-fifth optional implementation of the fourth aspect, the first transmission indication information includes the third resource, and the receiving module is configured to receive the first transmission indication information by using notification signaling of the first uplink information, or the receiving module is configured to receive the first transmission indication information by using notification signaling of the second uplink information.

With reference to any one of the twenty-sixth to the thirty-fifth optional implementations of the fourth aspect, in a thirty-sixth optional implementation of the fourth aspect, the second transmission indication information includes the fourth resource, and the receiving module is configured to receive the second transmission indication information by using notification signaling of the second uplink information, or the receiving module is configured to receive the second transmission indication information by using notification signaling of the first uplink information.

With reference to the thirty-fifth or the thirty-sixth optional implementation of the fourth aspect, in a thirty-seventh optional implementation of the fourth aspect, a manner of configuring the notification signaling of the first uplink information is semi-static configuration, and the receiving module is configured to receive the first transmission indication information and/or the second transmission indication information by using a broadcast message; or a manner of configuring the notification signaling of the first uplink information is dynamic configuration, and the receiving module is configured to receive the first transmission indication information and/or the second transmission indication information by using at least one of the following signaling: dedicated signaling, higher-layer signaling, MAC signaling, and physical-layer signaling.

With reference to any one of the thirty-fifth to the thirty-seventh optional implementations of the fourth aspect, in a thirty-eighth optional implementation of the fourth aspect, a manner of configuring the notification signaling of the second uplink information is semi-static configuration, and the receiving module is configured to receive the first transmission indication information and/or the second transmission indication information by using a broadcast message; or a manner of configuring the notification signaling of the second uplink information is dynamic configuration, and the receiving module is configured to receive the first transmission indication information and/or the second transmission indication information by using at least one of the following signaling: dedicated signaling, higher-layer signaling, MAC signaling, and physical-layer signaling.

With reference to any one of the thirty-fifth to the thirty-eighth optional implementations of the fourth aspect, in a thirty-ninth optional implementation of the fourth aspect, the manner of configuring the notification signaling of the first uplink information is the dynamic configuration, and the receiving module is configured to receive the first transmission indication information and/or the second transmission indication information by using uplink grant signaling or uplink scheduling signaling.

With reference to any one of the thirty-fifth to the thirty-ninth optional implementations of the fourth aspect, in a fortieth optional implementation of the fourth aspect, the receiving module is configured to receive the first transmission indication information and/or the second transmission indication information by using downlink control information DCI.

With reference to the fortieth optional implementation of the fourth aspect, in a forty-first optional implementation of the fourth aspect, a type of the DCI is used to instruct to: send the second uplink information by using the physical resource block PRB including the muting area.

With reference to any one of the thirty-fifth to the forty-first optional implementations of the fourth aspect, in a forty-second optional implementation of the fourth aspect, the second uplink information includes a PUCCH, the receiving module is configured to receive the first transmission indication information by using the notification signaling of the second uplink information, and the manner of configuring the notification signaling of the second uplink information is the semi-static configuration.

With reference to any one of the thirty-fifth to the forty-second optional implementations of the fourth aspect, in a forty-second optional implementation of the fourth aspect, the first transmission indication information includes a carrier identifier of the first uplink information, and/or the second transmission indication information includes a carrier identifier of the second uplink information.

A fifth aspect of the present invention provides a base station, including any uplink information sending apparatus in the third aspect.

A sixth aspect of the present invention provides user equipment, including any uplink information sending apparatus in the fourth aspect.

In the uplink information sending method provided in the embodiments of the present invention, the base station sends at least one of the first transmission indication information of the first uplink information and the second transmission indication information to the UE, and the UE determines, based on the first transmission indication information and/or the second transmission indication information, the UE behavior when the collision occurs. The uplink information sending method provided in the present invention is used to mitigate impact of a carrier collision on processing efficiency of the UE.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

It should be noted that terms such as "first", "second", "third", and "fourth" in the specification, claims, and accompanying drawings of the present invention are used to distinguish between similar objects, and are not necessarily used to describe a particular sequence or order. It should be understood that data termed in such a way are interchangeable in proper circumstances so that the embodiments of the present invention described herein can be implemented in orders except the order illustrated or described herein. Moreover, terms "including", "having", and any other variants mean to cover a non-exclusive inclusion, for example, a process, method, system, product, or device that includes a list of steps or units is not necessarily limited to those steps or units that are expressly listed, but may include other units not expressly listed or inherent to such a process, method, system, product, or device.

In a carrier aggregation scenario, an uplink carrier aggregation capability supported by UE is usually lower than a downlink carrier aggregation capability, that is, on some carriers, the UE has only a downlink transmission capability but no uplink transmission capability. Therefore, when a base station needs to obtain uplink signals, such as sounding reference signals SRSs, of these carriers, an uplink carrier allocated to the UE needs to be switched to any carrier of the UE. During carrier switching, a carrier collision with a carrier on which uplink information (such as a PUCCH, a PUSCH, or PRACH) needs to be sent by the UE may occur. A carrier collision means: A total quantity of a carrier on which the base station instructs the UE to send first uplink information, and a carrier that is to be used by second uplink information that needs to be sent by the UE, in a same subframe exceeds the uplink carrier aggregation capability of the UE. There is no PUSCH transmission on the carrier of the first uplink information sent by the UE. Therefore, an embodiment of the present invention provides an uplink information sending method, to reduce impact of a carrier collision on UE.

Figure 1:
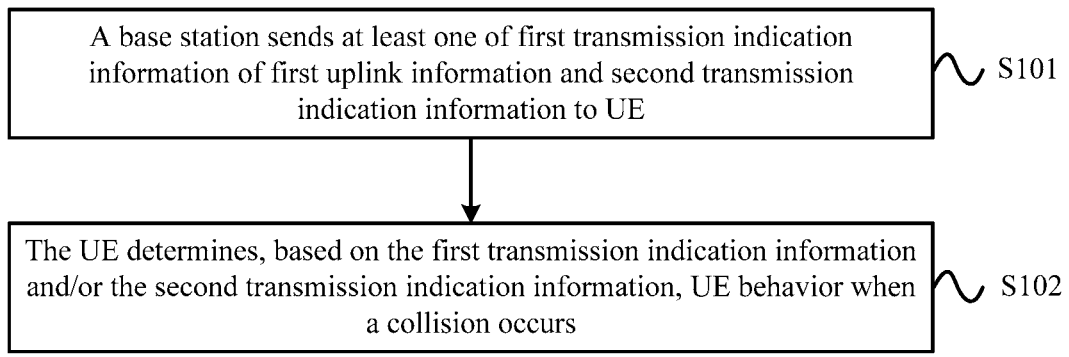
FIG. 1 is a flowchart of Embodiment 1 of an uplink information sending method according to an embodiment of the present invention.

FIG. 1 is a flowchart of Embodiment 1 of an uplink information sending method according to an embodiment of the present invention.

As shown in FIG. 1, this embodiment of the present invention may be executed by a base station and UE. This embodiment of the present invention may include the following steps.

S101: The base station sends at least one of first transmission indication information of first uplink information and second transmission indication information to the UE.

The first transmission indication information includes a subframe and/or a carrier on which the base station instructs the UE to send the first uplink information. The first transmission indication information and/or the second transmission indication information are/is used to indicate UE behavior when a collision occurs. The collision means: in the subframe, which is indicated by the base station, of the first uplink information, a total quantity of the carrier of the first uplink information and a carrier used by second uplink information that needs to be sent by the UE exceeds an uplink carrier aggregation capability of the UE.

Optionally, the first uplink information may be an uplink signal, for example, a sounding reference signal SRS, a preamble, or a sequence. The first uplink information is periodic first uplink information or aperiodic first uplink information, for example, a periodic SRS or an aperiodic SRS.

Optionally, the second uplink information may be an uplink channel, for example, a physical uplink control channel PUCCH, a physical uplink shared channel PUSCH, a physical random access channel PRACH, or information corresponding to the foregoing channels.

S102: The UE determines, based on the first transmission indication information and/or the second transmission indication information, UE behavior when a collision occurs. It should be noted that the subframe mentioned in this embodiment of the present invention may be a subframe, or may be a subframe group or a subframe set, where the subframe group may be a subframe set; and the carrier mentioned in this embodiment of the present invention may be a carrier, or may be a carrier group or a carrier set, where the carrier group may also be a carrier set. The uplink information sending method provided in the present invention is used to mitigate impact of a carrier collision on processing efficiency of the UE.

Figure 2:
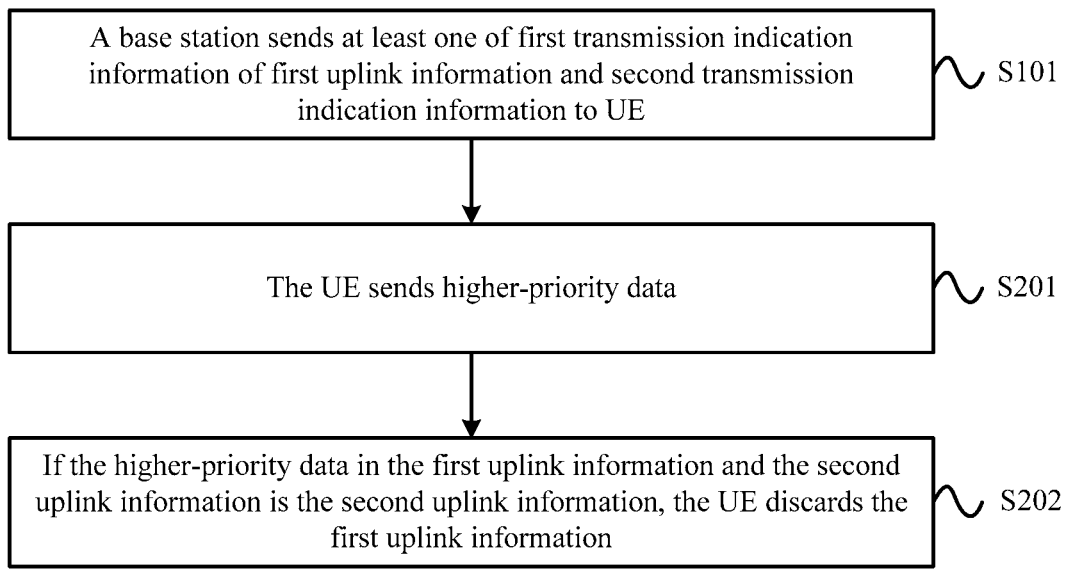
FIG. 2 is a flowchart of Embodiment 2 of an uplink information sending method according to an embodiment of the present invention.

FIG. 2 is a flowchart of Embodiment 2 of an uplink information sending method according to an embodiment of the present invention.

Based on the method shown in FIG. 1, this embodiment of the present invention may include the following step: If the base station sends the second transmission indication information to the UE in S101, and the second transmission indication information includes a first priority rule, S102 may include the following step:

S201: The UE sends higher-priority data.

The higher-priority data is determined from the first uplink signal and to-be-sent uplink information of the UE based on the first priority rule. The first priority rule includes a priority of the first uplink information and the second uplink information.

Optionally, after S201, S102 may further include the following step:

S202: If the higher-priority data in the first uplink information and the second uplink information is the second uplink information, the UE discards the first uplink information.

It should be noted that the first priority rule may include a priority rule between first uplink information in a plurality of scenarios and second uplink information in a plurality of scenarios.

For example, the first uplink information in the plurality of scenarios may include periodic first uplink information and aperiodic first uplink information, and the second uplink information in the plurality of scenarios may include a PRACH, a PUSCH, and a PUCCH. A first optional implementation of the first priority rule may include at least one of the following:

a priority of the PRACH is higher than that of the aperiodic first uplink information;

the priority of the PRACH is higher than that of the periodic first uplink information;

a priority of the PUCCH is higher than that of the periodic first uplink information; and a priority of the PUSCH is higher than that of the periodic first uplink information.

Optionally, a second optional implementation of the first priority rule may further include:

a priority of a PUCCH including only channel state information CSI information is lower than that of the aperiodic first uplink information.

It should be noted that a PUCCH including only CSI does not include a hybrid automatic repeat request HARQ response message (HARQ-ACK&SR).

Optionally, a third optional implementation of the first priority rule may further include:

a priority of a PUCCH including only CSI information is higher than that of the aperiodic first uplink information.

It should be noted that a PUCCH including only CSI does not include a hybrid automatic repeat request HARQ response message (HARQ-ACK&SR).

Optionally, based on the second or the third optional implementation of the first priority rule, in a fourth optional implementation of the first priority rule, the first priority rule may further include:

a priority of a PUCCH including a HARQ is higher than that of the aperiodic first uplink information.

Optionally, in a fifth optional implementation of the first priority rule, the first priority rule may further include:

the priority of the PUCCH is higher than that of the aperiodic first uplink information.

Optionally, based on any one of the first to the fifth optional implementations of the first priority rule, in a sixth optional implementation of the first priority rule, the first priority rule may further include:

a priority of a PUSCH including uplink control information UCI is higher than that of the aperiodic first uplink information.

Optionally, based on any one of the first to the fifth optional implementations of the first priority rule, in a seventh optional implementation of the first priority rule, the first priority rule may further include:

a priority of a PUSCH including UCI is lower than that of the aperiodic first uplink information.

Optionally, based on any one of the first to the seventh optional implementations of the first priority rule, in an eighth optional implementation of the first priority rule, the first priority rule may further include:

a priority of a PUSCH not including UCI is lower than that of the aperiodic first uplink information.

Optionally, based on any one of the first to the seventh optional implementations of the first priority rule, in a ninth optional implementation of the first priority rule, the first priority rule may further include:

a priority of a PUSCH not including UCI is higher than that of the aperiodic first uplink information.

Optionally, based on any one of the first to the seventh optional implementations of the first priority rule, in a tenth optional implementation of the first priority rule, the first priority rule may further include:

the priority of the PUSCH is higher than that of the aperiodic first uplink information.

Optionally, in the foregoing optional implementations of a first priority, the first uplink information is located on a carrier of a primary cell PCell or a carrier of a secondary cell SCell.

Optionally, in the foregoing optional implementations of the first priority, the second uplink information is located on the carrier of the PCell or the carrier of the secondary cell SCell.

It should be noted that, for a periodic first uplink signal, a priority of a periodic first uplink signal located in a PCell is higher than that of a periodic first uplink signal located in an SCell; and for an aperiodic first uplink signal, a priority of an aperiodic first uplink signal located in a PCell is higher than that of an aperiodic first uplink signal located in an SCell. However, a priority relationship between a first uplink signal and a second uplink signal is not affected by whether the first uplink signal or the second uplink signal is located in a PCell or an SCell.

It should be further noted that, usually, a priority of a PRACH is higher than that of a PUCCH, and the priority of the PUCCH is higher than that of a PUSCH. Preferably, referring to Table 1, Table 1 is a preferred implementation of a first priority provided in this embodiment of the present invention.

TABLE 1

1.

| | | Whether a priority of second uplink data is higher than a priority of first uplink data | |
|---|---|---|---|
| Second uplink data | | Aperiodic first uplink data | Periodic first uplink data |
| PRACH | PRACH | Yes | Yes |
| PUCCH | PUCCH with HARQ-ACK | Yes | Yes |
| | PUCCH without HARQ-ACK, with CSI | Yes or no | Yes |
| | Other PUCCHs | Yes | Yes |
| PUSCH | PUSCH with UCI | Yes | Yes |
| | PUSCH without UCI | Yes or no | Yes |
| | Other PUSCHs | Yes | Yes |

The PUCCH with HARQ-ACK is a PUCCH including hybrid automatic repeat. The PUCCH without HARQ-ACK, with CSI is a PUCCH not including a HARQ but including CSI. The PUSCH with UCI is a PUSCH including uplink control information. The PUSCH without UCI is a PUSCH not including uplink control information. The "yes or no" in the foregoing table means that an option may be set to yes in a setting of the first priority, and may be set to no in another priority setting.

Figure 3:
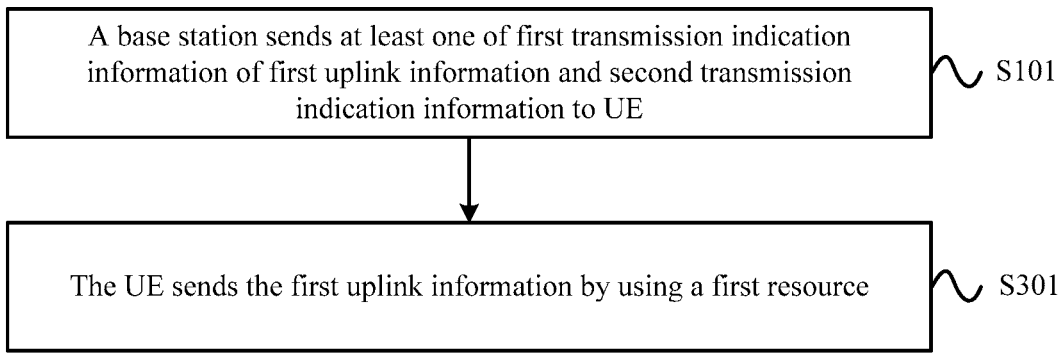
FIG. 3 is a flowchart of Embodiment 3 of an uplink information sending method according to an embodiment of the present invention.

FIG. 3 is a flowchart of Embodiment 3 of an uplink information sending method according to an embodiment of the present invention.

Based on the method shown in FIG. 1, this embodiment of the present invention may include the following step.

The first transmission indication information in S101 includes a first resource, where the first resource is used to indicate a subframe and/or a subframe group on which the UE sends the first uplink information, and/or, a carrier and/or a carrier group on which the UE sends the first uplink information.

Optionally, the first resource belongs to a preset preferential resource set. The preferential resource set includes the subframe and/or the subframe group, and/or, the carrier and/or the carrier group, on which a priority of the first uplink information is higher than a priority of the second uplink information. Optionally, the first resource is a subframe and/or a subframe group that can be used to perform switching for the first uplink information, and/or, a carrier and/or a carrier group that can be used to perform switching for the first uplink information. Optionally, a resource used by the second uplink information is a subframe and/or a subframe group that cannot be used to perform switching for the first uplink information, and/or, a carrier and/or a carrier group that cannot be used to perform switching for the first uplink information.

Then S102 may include the following step:

S301: The UE sends the first uplink information by using the first resource.

Preferably, the first resource and the resource used by the second uplink information satisfy a carrier collision avoidance condition, and the carrier collision avoidance condition is: A total quantity of carriers, used by the first uplink information and the second uplink information, in a same subframe is less than the uplink carrier aggregation capability of the UE.

It should be noted that the resource used by the second uplink information is preconfigured, and the second uplink information includes a PUCCH, a PUSCH, a PRACH, or information corresponding to each of foregoing channels.

Optionally, the base station may send the first transmission indication information to the UE by using higher-layer signaling or physical-layer signaling. Optionally, the base station may send the first transmission indication information by using layer-1 (Layer 1) signaling.

In the uplink information sending manner provided in this embodiment of the present invention, the base station may allocate a preferred resource to the UE for sending the first uplink information. The preferred resource can be used to reduce or avoid a carrier collision, and reduce impact of a carrier collision on processing efficiency of the UE.

Figure 4:
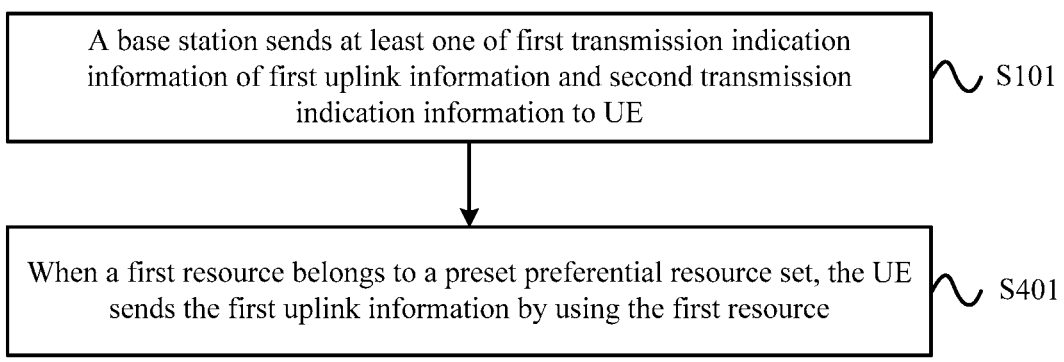
FIG. 4 is a flowchart of Embodiment 4 of an uplink information sending method according to an embodiment of the present invention.

FIG. 4 is a flowchart of Embodiment 4 of an uplink information sending method according to an embodiment of the present invention.

Based on the method shown in FIG. 1, this embodiment of the present invention may include the following step.

The first transmission indication information sent by the base station to the UE in S101 may include a first resource, where the first resource is used to indicate a subframe and/or a subframe group on which the UE sends the first uplink information, and/or, a carrier and/or a carrier group on which the UE sends the first uplink information. In addition, the second transmission indication information sent by the base station to the UE in S101 may include:

a second priority, where the second priority is used to instruct the UE to: when the first resource belongs to a preset preferential resource set, send the first uplink information by using the first resource, and the preferential resource set includes the subframe and/or the subframe group, and/or, the carrier and/or the carrier group, on which a priority of the first uplink information is higher than a priority of the second uplink information.

Then S102 may include the following step:

S401: When the first resource belongs to a preset preferential resource set, the UE sends the first uplink information by using the first resource.

Preferably, the first resource belongs to the preset preferential resource set. The preferential resource set includes a subframe and/or a subframe group on which a priority of the first uplink information is higher than a priority of the second uplink information, and/or, a carrier and/or a carrier group on which a priority of the first uplink information is higher than a priority of the second uplink information.

Preferably, the first resource and the resource used by the second uplink information satisfy a carrier collision avoidance condition, and the carrier collision avoidance condition is: A total quantity of carriers, used by the first uplink information and the second uplink information, in a same subframe is less than the uplink carrier aggregation capability of the UE.

It should be noted that the resource used by the second uplink information is preconfigured, and the second uplink information includes PUCCH information, PUSCH information, or PRACH information.

Optionally, the base station may send the first transmission indication information to the UE by using higher-layer signaling or physical-layer signaling. Optionally, the base station may send the first transmission indication information by using layer-1 (Layer 1) signaling.

In the uplink information sending manner provided in this embodiment of the present invention, the base station may indicate, to the UE, that a first uplink signal has a higher priority on the preferred resource, and the UE may quickly determine to send the first uplink signal or a second uplink signal, thereby reducing impact of a carrier collision on processing efficiency of the UE.

Figure 5:
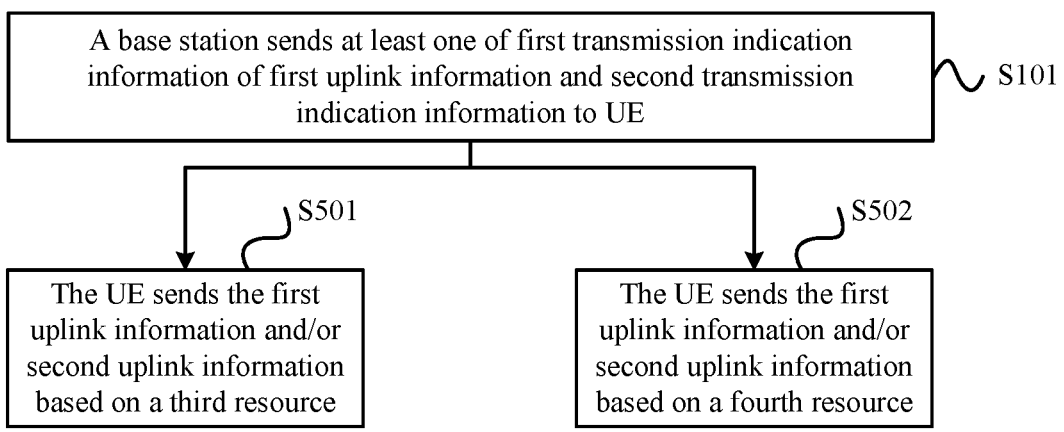
FIG. 5 is a flowchart of Embodiment 5 of an uplink information sending method according to an embodiment of the present invention.

FIG. 5 is a flowchart of Embodiment 5 of an uplink information sending method according to an embodiment of the present invention.

Based on the method shown in FIG. 1, this embodiment of the present invention may include the following steps.

In S101, the base station sends the first transmission indication information to the UE, and the first transmission indication information may include:

a third resource, where the third resource is used to indicate a time domain resource, a frequency domain resource, and/or a space domain resource that are/is used by the UE to send the first uplink information; and/or in S101, the base station sends the second transmission indication information to the UE, and the second transmission indication information includes:

a fourth resource, where the fourth resource is used to indicate a time domain resource, a frequency domain resource, and/or a space domain resource that are/is used by the UE to send the second uplink information.

Then S102 may include S501 and/or S502:

S501: The UE sends the first uplink information and/or the second uplink information based on the third resource.

The UE sends the first uplink information on the third resource, and does not send the second uplink information on a corresponding time domain resource of a carrier that is subject to a carrier collision with the third resource. The corresponding time domain resource of the carrier that is subject to the carrier collision with the third resource is the same as the time domain resource of the third resource.

S502: The UE sends the first uplink information and/or the second uplink information based on the fourth resource.

The UE sends the second uplink information on the fourth resource, and sends the first uplink information on a corresponding time domain resource of a carrier that is subject to a carrier collision with the fourth resource. The corresponding time domain resource of the carrier that is subject to the carrier collision with the fourth resource is different from the time domain resource of the fourth resource.

It should be noted that the time domain resource, the frequency domain resource, and/or the space domain resource that are/is determined by the UE based on the third resource and/or the fourth resource for sending second uplink data include/includes only an available part, that is, are/is not subject to a carrier collision with the time domain resource, the frequency domain resource, and/or the space domain resource of first uplink data.

Preferably, considering a delay of uplink carrier switching, the time domain resource and/or the frequency domain resource used by the first uplink data may include several OFDM symbols, and a muting area in the time domain resource and/or the frequency domain resource used by the second uplink data may exceed the time domain resource and/or the frequency domain resource used by the first uplink data.

Optionally, the time domain resource used by the first uplink information may include at least one of location information of the subframe occupied by the first uplink information, orthogonal frequency division multiplexing OFDM location information, cyclic shift information, and an SRS sending subframe offset.

Optionally, the time domain resource used by the second uplink information includes a time domain location of a physical resource block PRB that includes a muting area and that is used to send the second uplink information, and/or a time domain location of the muting area. The time domain location of the muting area includes a start time point and an end time point of the muting area.

Optionally, the frequency domain resource of the first uplink information includes at least one of location information of the frequency domain resource occupied by the first uplink information, information of the carrier occupied by the first uplink information, bandwidth information, and a frequency hopping configuration.

Optionally, the frequency domain resource of the second uplink information includes a frequency domain location of a PRB that includes a muting area and that is used to send the second uplink information, and/or a frequency domain location of the muting area.

Optionally, the space domain resource is port information.

It should be further noted that, if the first transmission indication message sent by the base station to the UE in S101 includes the third resource, S102 may include S501; if the second transmission indication message sent by the base station to the UE in S102 includes the fourth resource, S102 may include S502; or if the first transmission indication message sent by the base station to the UE in S101 includes the third resource, and the second transmission indication message includes the fourth resource, S102 may include at least one of S501 or S502.

In this embodiment, optionally, if the first transmission indication information includes the third resource, the base station may send the first transmission indication information by using notification signaling of the first uplink information, or the base station sends the first transmission indication information by using notification signaling of the second uplink information.

Optionally, if the second transmission indication information includes the fourth resource, the base station may send the second transmission indication information by using notification signaling of the second uplink information, or the base station sends the second transmission indication information by using notification signaling of the first uplink information.

For example, if the first uplink information is an SRS, the second uplink information is a PUSCH, and the first transmission indication information includes a third resource for sending the SRS, the base station may indicate, in notification signaling of the SRS, the third resource for sending the SRS; and the UE may determine, based on the third resource, a time domain resource, a frequency domain resource, and/or a space domain resource that are/is used to send the SRS, and may determine, based on the third resource, a time domain resource, a frequency domain resource, and/or a space domain resource that are/is used to send the PUSCH. Specifically, the UE does not send the PUSCH on a time domain resource, which is the same as the time domain resource of the third resource, on a carrier of the PUSCH.

Figure 6:
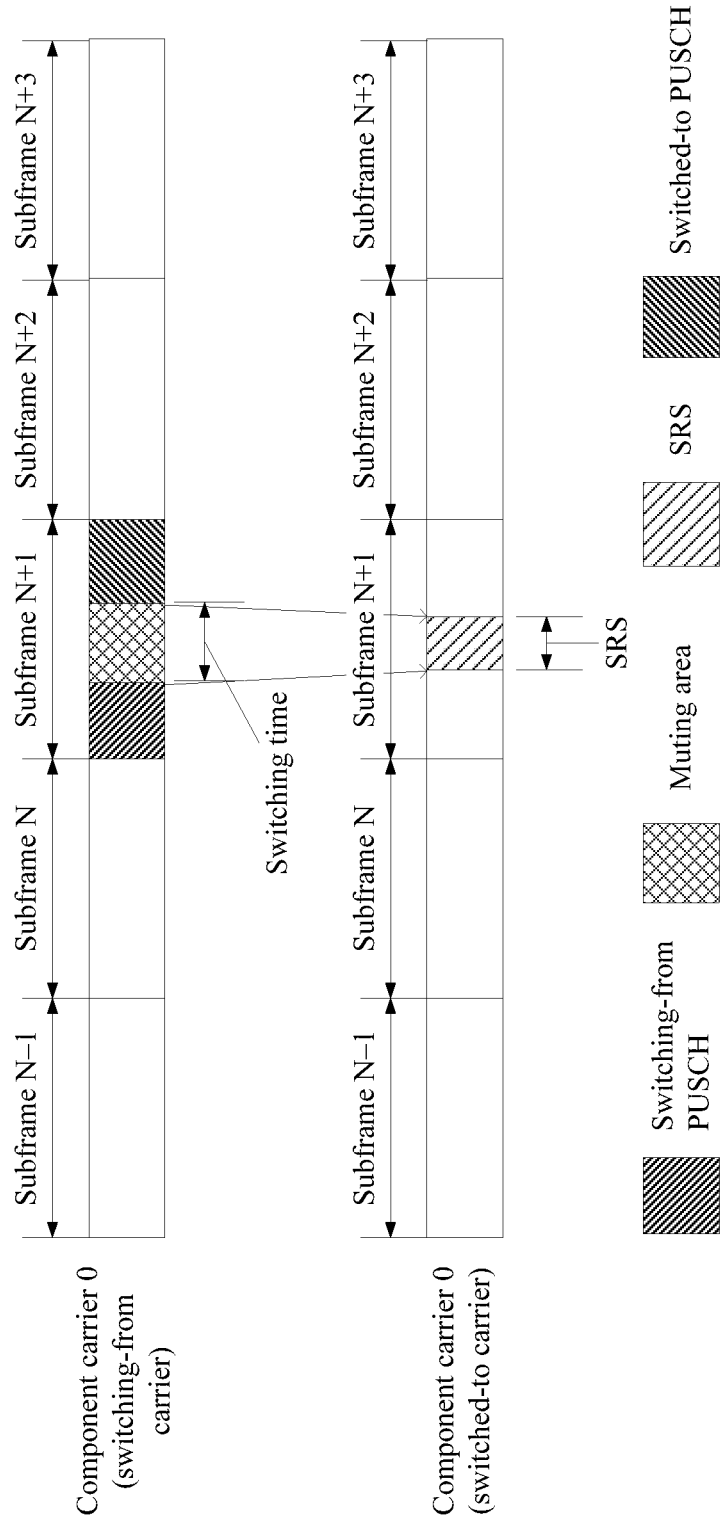
FIG. 6 is a schematic diagram of carrier switching in Embodiment 3 of an uplink information sending method shown in FIG. 5.

Referring to FIG. 6, FIG. 6 is a schematic diagram of carrier switching in Embodiment 3 of an uplink information sending method shown in FIG. 5. An optional implementation is: The UE may start muting area switching on a PUSCH carrier of a subframe that may be subject to a carrier collision. At a start time point that is indicated by the third resource and that is for sending the SRS, the UE stops sending data on the carrier on which the PUSCH is located, and starts to send the SRS on a carrier of the SRS; and at an end time point, stops sending the SRS on the carrier on which the SRS is located, and resumes sending the data on the carrier on which the PUSCH is located. This is equivalent to that an uplink carrier supported by the UE is switched. The carrier on which the PUSCH is located is a switching-from carrier, and the carrier on which the SRS is located is a switched-to carrier.

Preferably, the time domain location of the muting area is in an uplink pilot timeslot UpPTS physical channel.

The method provided in this embodiment of the present invention is equivalent to that in a subframe, the UE maintains, in different time periods, that the uplink carrier aggregation capability of the UE is not exceeded, so that the UE can send the first uplink information and the second uplink information on a required carrier.

For another example, if the first uplink information is an SRS, the second uplink information is a PUSCH, and the first transmission indication information includes a third resource for sending the SRS, the base station may indicate, in notification signaling of the SRS, the third resource for sending the SRS; or may indicate, in notification signaling of the PUSCH, the third resource for sending the SRS. In a case of cross-carrier scheduling, that is, when the third resource for sending the first uplink information is indicated in the notification signaling of the second uplink information, the first transmission indication information may further include a carrier identifier of the first uplink information. Similarly, when the fourth resource for sending the second uplink information is indicated in the notification signaling of the first uplink information, the second transmission indication information may further include a carrier identifier of the second uplink information.

Optionally, a manner of configuring the notification signaling of the first uplink information and the notification signaling of the second uplink information may be semi-static configuration, dynamic configuration, or the like.

When the manner of configuring the notification signaling is the semi-static configuration, the base station may notify the first transmission indication information and/or the second transmission indication information by using a broadcast message.

When the manner of configuring the notification signaling is the dynamic configuration, the base station notifies the first transmission indication information and/or the second transmission indication information by using at least one of the following signaling: dedicated signaling, higher-layer signaling, MAC signaling, and physical-layer signaling. The dedicated signaling may be physical-layer signaling or higher-layer signaling.

Optionally, when the manner of configuring the notification signaling is the dynamic configuration, the base station may send the first transmission indication information and/or the second transmission indication information to the UE by using extended uplink grant signaling or uplink scheduling signaling. The uplink grant signaling or the uplink scheduling signaling includes an extension bit, used to send the first transmission indication information and/or the second transmission indication information.

Optionally, the base station may send the first transmission indication information and/or the second transmission indication information to the UE by using extended downlink control information DCI. The extended DCI includes a newly defined DCI type, such as DCI 5. The newly defined DCI type is used to instruct to: send the second uplink information by using the physical resource block PRB including the muting area. A time domain resource of the muting area includes a start time point and an end time point of the muting area. The DCI is used to activate a new PRB format, and the base station may instruct, by using the DCI, the UE to send a PUSCH or a PUCCH by using a new PRB.

Optionally, if the second uplink information includes a PUCCH, the manner of configuring the notification signaling of the second uplink information is the semi-static configuration, and the base station indicates the first transmission indication information in the notification signaling of the second uplink information.

It should be further noted that, according to the uplink information sending method provided in this embodiment of the present invention, uplink channel quality is measured by using an uplink SRS, and downlink channel information is obtained based on a distinction between channels, so as to perform downlink scheduling and transmission. Therefore, the distinction between channels is effectively utilized on a TDD (time division duplex) carrier. Particularly, a carrier collision probability greatly increases when a carrier aggregation capability of the UE is improved to 32 carriers, most component carriers (component carrier, CC for short) are TDD carriers, and carrier switching is performed for an SRS or other uplink information indicated by the base station needs to be sent on more uplink carriers. According to the uplink signal sending method provided in this embodiment of the present invention, an uplink transmission resource can be fully utilized, a carrier collision is avoided, impact of a carrier collision on the UE is reduced, and processing efficiency of the UE is improved.

It should be noted that this embodiment of the present invention further provides an optional implementation based on the method shown in FIG. 1 to FIG. 6. In this implementation, the first uplink information includes at least two pieces of uplink information that the base station instructs the UE to send. For example, the UE sends SRSs on at least two carriers. Then the base station may use any uplink information sending method shown in FIG. 1 to FIG. 6 for each uplink information that the base station instructs the UE to send, so that the UE determines UE behavior. The base station may send, in indication information of one of the uplink information, first transmission indication information and/or second transmission indication information that are/is corresponding to each uplink information; or may send, in indication information of different uplink information, first transmission indication information and/or second transmission indication information that are/is corresponding to each uplink information.

Figure 7:
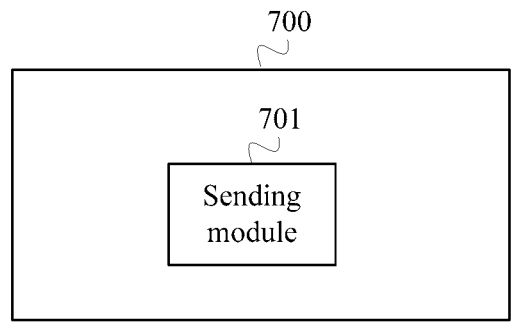
FIG. 7 is a schematic structural diagram of Embodiment 1 of an uplink information sending apparatus according to an embodiment of the present invention.

FIG. 7 is a schematic structural diagram of Embodiment 1 of an uplink information sending apparatus according to an embodiment of the present invention.

The uplink information sending apparatus provided in the present invention may be located on a base station side. As shown in FIG. 7, the uplink information sending apparatus 700 in this embodiment of the present invention may include:

a sending module 701, configured to send at least one of first transmission indication information of first uplink information and second transmission indication information to user equipment UE.

The first transmission indication information includes a subframe and/or a carrier on which the base station instructs the UE to send the first uplink information.

The first transmission indication information and/or the second transmission indication information are/is used to indicate UE behavior when a collision occurs.

It should be noted that the collision means: In the subframe, which is indicated by the base station, of the first uplink information, a total quantity of the carrier of the first uplink information and a carrier used by second uplink information that needs to be sent by the UE exceeds an uplink carrier aggregation capability of the UE.

Optionally, the first uplink information is a sounding reference signal SRS, a preamble, or a sequence.

Optionally, the first uplink information is periodic first uplink information or aperiodic first uplink information.

Optionally, the second uplink information is a physical uplink control channel PUCCH, a physical uplink shared channel PUSCH, a physical random access channel PRACH, or information corresponding to the foregoing channels.

Based on the foregoing implementation of the uplink information sending apparatus 700, this embodiment of the present invention further provides an optional implementation of the uplink information sending apparatus 700.

The second transmission indication information may include a first priority rule, and the first priority rule includes a priority of the first uplink information and a priority of the second uplink information.

It should be noted that the first priority rule may be used to instruct the UE to: determine, based on the first priority rule, higher-priority data from the first uplink information and the second uplink information, and send the higher-priority data.

Optionally, the first priority rule may be further used to: if the higher-priority data in the first uplink information and the second uplink information is the second uplink information, the first priority rule is further used to instruct the UE to discard the first uplink information.

Optionally, implementations of the first priority in this embodiment of the present invention are the same as the implementations of the first priority that are shown in FIG. 2. Details are not described herein again.

Based on the foregoing implementation of the uplink information sending apparatus 700, this embodiment of the present invention further provides another optional implementation of the uplink information sending apparatus 700.

In a first case, the first transmission indication information may include a first resource, where the first resource is used to indicate a subframe and/or a subframe group on which the UE sends the first uplink information, and/or, a carrier and/or a carrier group on which the UE sends the first uplink information.

The second transmission indication information includes a second priority, where the second priority is used to instruct the UE to: when the first resource belongs to a preset preferential resource set, send the first uplink information by using the first resource. The preferential resource set includes the subframe and/or the subframe group, and/or, the carrier and/or the carrier group, on which a priority of the first uplink information is higher than a priority of the second uplink information.

Alternatively, in a second case, the first transmission indication information may include a first resource, where the first resource is used to indicate a subframe and/or a subframe group on which the UE sends the first uplink information, and/or, a carrier and/or a carrier group on which the UE sends the first uplink information.

Preferably, in the second case, the first resource may belong to a preset preferential resource set. The preferential resource set includes the subframe and/or the subframe group, and/or, the carrier and/or the carrier group, on which a priority of the first uplink information is higher than a priority of the second uplink information.

Optionally, the first resource and a resource used by the second uplink information satisfy a collision avoidance condition. The collision avoidance condition is: A total quantity of carriers, used by the first uplink information and the second uplink information, in a same subframe is less than the uplink carrier aggregation capability of the UE.

It should be noted that the resource used by the second uplink information is preconfigured, and the second uplink information includes PUCCH information, PUSCH information, or PRACH information.

Optionally, the sending module is configured to send the first transmission indication information to the UE by using higher-layer signaling or physical-layer signaling.

Based on the implementation of the uplink information sending apparatus 700 shown in FIG. 7, this embodiment of the present invention further provides still another optional implementation of the uplink information sending apparatus 700.

The first transmission indication information includes:

a third resource, where the third resource is used to indicate a time domain resource, a frequency domain resource, and/or a space domain resource that are/is used by the UE to send the first uplink information.

Optionally, the second transmission indication information includes:

a fourth resource, where the fourth resource is used to indicate a time domain resource, a frequency domain resource, and/or a space domain resource that are/is used by the UE to send the second uplink information.

Optionally, the time domain resource used by the first uplink information includes at least one of location information of the subframe occupied by the first uplink information, orthogonal frequency division multiplexing OFDM location information, cyclic shift information, and an SRS sending subframe offset.

Optionally, the time domain resource used by the second uplink information includes a time domain location of a physical resource block PRB that includes a muting area and that is used to send the second uplink information, and/or a time domain location of the muting area.

Optionally, the time domain location of the muting area is in an uplink pilot timeslot UpPTS physical channel.

Optionally, the time domain location of the muting area includes a start time point and an end time point of the muting area.

Optionally, the frequency domain resource of the first uplink information includes at least one of location information of the frequency domain resource occupied by the first uplink information, information of the carrier occupied by the first uplink information, bandwidth information, and a frequency hopping configuration.

Optionally, the frequency domain resource of the second uplink information includes a frequency domain location of a PRB that includes a muting area and that is used to send the second uplink information, and/or a frequency domain location of the muting area.

Optionally, the space domain resource is port information.

Optionally, if the first transmission indication information includes the third resource, the sending module is configured to send the first transmission indication information by using notification signaling of the first uplink information, or the sending module is configured to send the first transmission indication information by using notification signaling of the second uplink information.

Optionally, if the second transmission indication information includes the fourth resource, the sending module is configured to send the second transmission indication information by using notification signaling of the second uplink information, or the sending module is configured to send the second transmission indication information by using notification signaling of the first uplink information.

Optionally, a manner of configuring the notification signaling of the first uplink information is semi-static configuration, and the sending module is configured to notify the first transmission indication information and/or the second transmission indication information by using a broadcast message; or a manner of configuring the notification signaling of the first uplink information is dynamic configuration, and the sending module is configured to notify the first transmission indication information and/or the second transmission indication information by using at least one of the following signaling: dedicated signaling, higher-layer signaling, MAC signaling, and physical-layer signaling.

Optionally, a manner of configuring the notification signaling of the second uplink information is semi-static configuration, and the sending module is configured to notify the first transmission indication information and/or the second transmission indication information by using a broadcast message; or a manner of configuring the notification signaling of the second uplink information is dynamic configuration, and the sending module is configured to notify the first transmission indication information and/or the second transmission indication information by using at least one of the following signaling: dedicated signaling, higher-layer signaling, MAC signaling, and physical-layer signaling.

Optionally, when the manner of configuring the notification signaling of the first uplink information is the dynamic configuration, the sending module is configured to send the first transmission indication information and/or the second transmission indication information to the UE by using extended uplink grant signaling or uplink scheduling signaling.

Optionally, the sending module is configured to send the first transmission indication information and/or the second transmission indication information to the UE by using extended downlink control information DCI. Optionally, a type of the DCI is used to instruct to: send the second uplink information by using the physical resource block PRB including the muting area.

Optionally, the second uplink information includes a PUCCH. The sending module is configured to indicate, in the notification signaling of the second uplink information, the first transmission indication information. The manner of configuring the notification signaling of the second uplink information is the semi-static configuration.

Optionally, the first transmission indication information includes a carrier identifier of the first uplink information, and/or the second transmission indication information includes a carrier identifier of the second uplink information.

Figure 8:
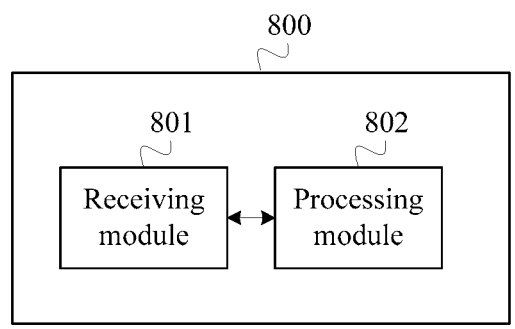
FIG. 8 is a schematic structural diagram of Embodiment 1 of another uplink information sending apparatus according to an embodiment of the present invention.

FIG. 8 is a schematic structural diagram of Embodiment 1 of another uplink information sending apparatus according to an embodiment of the present invention.

The uplink information sending apparatus provided in the present invention may be located on a UE side. As shown in FIG. 7, the uplink information sending apparatus 800 in this embodiment of the present invention may include:

a receiving module 801, configured to receive at least one of first transmission indication information of first uplink information and/or second transmission indication information that are/is sent by a base station, where the first transmission indication information includes a subframe and/or a carrier on which the base station instructs user equipment UE to send the first uplink information; and a processing module 802, configured to determine, based on the first transmission indication information and/or the second transmission indication information, UE behavior when a collision occurs.

The collision means: In the subframe, which is indicated by the base station, of the first uplink information, a total quantity of the carrier of the first uplink information and a carrier used by second uplink information that needs to be sent by the UE exceeds an uplink carrier aggregation capability of the UE.

It should be noted that the first uplink information may be a sounding reference signal SRS, a preamble, or a sequence. The first uplink information may be periodic first uplink information or aperiodic first uplink information. The second uplink information may be a physical uplink control channel PUCCH, a physical uplink shared channel PUSCH, a physical random access channel PRACH, or information corresponding to the foregoing channels.

Figure 9:
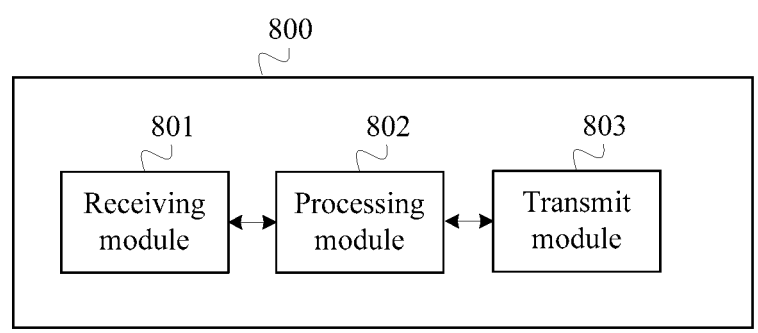
FIG. 9 is a schematic structural diagram of Embodiment 2 of another uplink information sending apparatus according to an embodiment of the present invention.

FIG. 9 is a schematic structural diagram of Embodiment 2 of another uplink information sending apparatus according to an embodiment of the present invention.

Based on the foregoing implementation of the uplink information sending apparatus 800, in this embodiment of the present invention, the uplink information sending apparatus 800 further includes a transmit module 803.

This embodiment of the present invention includes several optional implementations of the uplink information sending apparatus 800.

In a first optional implementation of the uplink information sending apparatus 800, the second transmission indication information includes a first priority rule, where the first priority rule includes a priority of the first uplink information and a priority of the second uplink information.

Then the transmit module 803 is configured to send higher-priority data, where the higher-priority data is determined from the first uplink information and the second uplink information based on the first priority rule.

Optionally, the processing module is further configured to discard the first uplink information, where the higher-priority data in the first uplink information and the second uplink information is the second uplink information.

Optionally, implementations of the first priority in this embodiment of the present invention are the same as the implementations of the first priority that are shown in FIG. 2. Details are not described herein again.

A second optional implementation of the uplink information sending apparatus 800 includes two cases.

In a first case of the second optional implementation of the uplink information sending apparatus 800, the second transmission indication information includes a first resource, where the first resource is used to indicate a subframe and/or a subframe group on which the UE sends the first uplink information, and/or, a carrier and/or a carrier group on which the UE sends the first uplink information.

The second transmission indication information includes a second priority, where the second priority is used to indicate a preset preferential resource set, and the first resource belongs to the preset preferential resource set.

The transmit module is further configured to send the first uplink information by using the first resource.

In a second case of the second optional implementation of the uplink information sending apparatus 800, the first transmission indication information includes:

a first resource, where the first resource is used to indicate a subframe and/or a subframe group on which the UE sends the first uplink information, and/or, a carrier and/or a carrier group on which the UE sends the first uplink information.

The transmit module is further configured to send the first uplink information by using the first resource.

Optionally, based on the second case, the first resource belongs to a preset preferential resource set. The preferential resource set includes the subframe and/or the subframe group, and/or, the carrier and/or the carrier group, on which a priority of the first uplink information is higher than a priority of the second uplink information.

Preferably, the first resource and the resource used by the second uplink information satisfy a carrier collision avoidance condition, and the carrier collision avoidance condition is: A total quantity of carriers, used by the first uplink information and the second uplink information, in a same subframe is less than the uplink carrier aggregation capability of the UE.

It should be noted that the resource used by the second uplink information is preconfigured, and the second uplink information includes PUCCH information, PUSCH information, or PRACH information.

Optionally, the receiving module is further configured to receive, for the UE by using higher-layer signaling or physical-layer signaling, the first transmission indication information sent by the base station.

In a third optional implementation of the uplink information sending apparatus 800, the first transmission indication information includes a third resource, where the third resource is used to indicate a time domain resource, a frequency domain resource, and/or a space domain resource that are/is used by the UE to send the first uplink information, and the transmit module is configured to send the first uplink information and/or the second uplink information based on the third resource; and/or the second transmission indication information includes a fourth resource, where the fourth resource is used to indicate a time domain resource, a frequency domain resource, and/or a space domain resource that are/is used by the UE to send the second uplink information, and the transmit module is configured to send the first uplink information and/or the second uplink information based on the fourth resource.

Optionally, the transmit module is configured to send the first uplink information on the third resource, and skip sending the second uplink information on a corresponding time domain resource of a carrier that is subject to a carrier collision with the third resource, where the corresponding time domain resource of the carrier that is subject to the carrier collision with the third resource is the same as the time domain resource of the third resource; and/or, the transmit module is configured to send the second uplink information on the fourth resource, and send the first uplink information on a corresponding time domain resource of a carrier that is subject to a carrier collision with the fourth resource, where the corresponding time domain resource of the carrier that is subject to the carrier collision with the fourth resource is different from the time domain resource of the fourth resource.

Optionally, the time domain resource used by the first uplink information includes at least one of location information of the subframe occupied by the first uplink information, orthogonal frequency division multiplexing OFDM location information, cyclic shift information, and an SRS sending subframe offset.

Optionally, the time domain resource used by the second uplink information includes a time domain location of a physical resource block PRB that includes a muting area and that is used to send the second uplink information, and/or a time domain location of the muting area; and the transmit module is configured to skip sending the second uplink information in the time domain location of the PRB that includes the muting area and that is used to send the second uplink information.

Optionally, the time domain location of the muting area includes a start time point and an end time point of the muting area.

Optionally, the frequency domain resource of the first uplink information includes at least one of location information of the frequency domain resource occupied by the first uplink information, information of the carrier occupied by the first uplink information, bandwidth information, and a frequency hopping configuration.

Optionally, the frequency domain resource of the second uplink information includes a frequency domain location of a PRB that includes a muting area and that is used to send the second uplink information, and/or a frequency domain location of the muting area.

Optionally, the space domain resource is port information.

Optionally, if the first transmission indication information includes the third resource, the receiving module is configured to receive the first transmission indication information by using notification signaling of the first uplink information, or the receiving module is configured to receive the first transmission indication information by using notification signaling of the second uplink information.

Optionally, if the second transmission indication information includes the fourth resource, the receiving module is configured to receive the second transmission indication information by using notification signaling of the second uplink information, or the receiving module is configured to receive the second transmission indication information by using notification signaling of the first uplink information.

Optionally, a manner of configuring the notification signaling of the first uplink information is semi-static configuration, and the receiving module is configured to receive the first transmission indication information and/or the second transmission indication information by using a broadcast message; or a manner of configuring the notification signaling of the first uplink information is dynamic configuration, and the receiving module is configured to receive the first transmission indication information and/or the second transmission indication information by using at least one of the following signaling: dedicated signaling, higher-layer signaling, MAC signaling, and physical-layer signaling.

Optionally, a manner of configuring the notification signaling of the second uplink information is semi-static configuration, and the receiving module is configured to receive the first transmission indication information and/or the second transmission indication information by using a broadcast message; or a manner of configuring the notification signaling of the second uplink information is dynamic configuration, and the receiving module is configured to receive the first transmission indication information and/or the second transmission indication information by using at least one of the following signaling: dedicated signaling, higher-layer signaling, MAC signaling, and physical-layer signaling.

Optionally, when the manner of configuring the notification signaling of the first uplink information is the dynamic configuration, the receiving module is configured to receive the first transmission indication information and/or the second transmission indication information by using uplink grant signaling or uplink scheduling signaling.

Optionally, the receiving module is configured to receive the first transmission indication information and/or the second transmission indication information by using downlink control information DCI. Optionally, a type of the DCI is used to instruct to: send the second uplink information by using the physical resource block PRB including the muting area.

Optionally, the second uplink information includes a PUCCH. The receiving module is configured to receive the first transmission indication information by using the notification signaling of the second uplink information. The manner of configuring the notification signaling of the second uplink information is the semi-static configuration.

Optionally, the first transmission indication information includes a carrier identifier of the first uplink information, and/or the second transmission indication information includes a carrier identifier of the second uplink information.

An embodiment of the present invention further provides a base station. The base station includes the uplink information sending apparatus shown in FIG. 7. The base station may perform the uplink information sending method shown in FIG. 1 to FIG. 6.

Other details of the technical solution of this embodiment of the present invention are similar to those of the embodiments shown in FIG. 1 to FIG. 7. Details are not described herein again.

An embodiment of the present invention further provides user equipment. The user equipment includes the uplink information sending apparatus shown in FIG. 8 and FIG. 9. The user equipment may perform the uplink information sending method shown in FIG. 1 to FIG. 6.

Other details of the technical solution of this embodiment of the present invention are similar to those of the embodiments shown in FIG. 1 to FIG. 9. Details are not described herein again.

In the several embodiments provided in this application, it should be understood that the disclosed device and method may be implemented in other manners. For example, the described device embodiments are merely examples. For example, the unit or module division is merely logical function division and may be other division in actual implementation. For example, a plurality of units or modules may be combined or integrated into another system, or some features may be ignored or not performed. In addition, the shown or discussed mutual couplings or direct couplings or communication connections may be implemented through some interfaces. The indirect couplings or communication connections between the devices or modules may be implemented in electrical, mechanical, or other forms.

The modules described as separate parts may or may not be physically separate, and parts shown as modules may or may not be physical modules, may be located in one position, or may be distributed on a plurality of network units. Some or all the modules may be selected according to actual needs to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. An uplink signal sending method comprising:
receiving, by user equipment (UE), first transmission indication information of first uplink information and second transmission indication information of second uplink information that are sent by a base station,
wherein the first uplink information is periodic or aperiodic sounding reference signal (SRS),
wherein the first transmission indication information comprises a third resource,
wherein the third resource indicates at least one of a time domain resource, a frequency domain, and a space domain resource that are/is used by the UE to send the first uplink information,
wherein the second uplink information is a physical uplink control channel (PUCCH) or a physical uplink shared channel (PUSCH),
wherein the second transmission indication information comprises a fourth resource, and
wherein the fourth resource indicates at least one of a time domain resource, a frequency domain, and a space domain resource that are/is used by the UE to send the second uplink information; and
sending, by the UE, the first uplink information based on the third resource or sending the second uplink information based on the fourth resource,
wherein the UE does not send the second uplink information on a corresponding time domain resource of a carrier that is subject to a carrier collision with the third resource,
wherein the corresponding time domain resource of the carrier overlaps the time domain resource of the third resource, and
wherein the carrier collision includes that in a subframe, which is indicated by the base station, of the first uplink information, a total quantity of the carrier of the first uplink information and a carrier used by second uplink information that needs to be sent by the UE exceeds an uplink carrier aggregation capability of the UE.

2. The method according to claim 1, wherein the second uplink information is the PUCCH that comprises channel state information (CSI).

3. The method according to claim 1, wherein sending the second uplink information based on the fourth resource comprises at least one of the following:

the second uplink information is a PUCCH comprising hybrid automatic repeat request (HARQ); and the first uplink information is periodic SRS, and the second uplink information is a PUCCH.

4. The method according to claim 1, wherein the time domain resource used by the first uplink information comprises at least one of location information of the subframe occupied by the first uplink information, orthogonal frequency division multiplexing (OFDM) location information, cyclic shift information, and an SRS sending subframe offset.

5. The method according to claim 1, wherein the first transmission indication information comprises:

first resource used for indicating a subframe and/or subframe group by which the UE sends the first uplink information, and/or, a carrier and/or carrier group by which the UE sends the first uplink information.

6. The method according to claim 1, wherein the first transmission indication information comprises a carrier identifier of the first uplink information, the carrier is a switched-to carrier and no PUSCH is sent on the carrier.

7. The method according to claim 1, wherein the UE receives the first transmission indication information through a high-layer signaling.

8. An uplink signal sending apparatus comprising:

a processor and a memory, wherein the memory is configured to store a program instruction; and the processor is configured to execute the program instruction in the memory to perform:

receiving first transmission indication information of first uplink information and second transmission indication information of second uplink information that are sent by a base station, wherein the first uplink information is periodic or aperiodic sounding reference signal (SRS), wherein the first transmission indication information comprises a third resource, wherein the third resource indicates at least one of a time domain resource, a frequency domain, and a space domain resource that are/is used by the UE to send the first uplink information, wherein the second uplink information is a physical uplink control channel (PUCCH) or a physical uplink shared channel (PUSCH), wherein the second transmission indication information comprises a fourth resource, and wherein the fourth resource indicates at least one of a time domain resource, a frequency domain, and a space domain resource that are/is used by the apparatus to send the second uplink information; and sending the first uplink information based on the third resource or sending the second uplink information based on the fourth resource, wherein the apparatus does not send the second uplink information on a corresponding time domain resource of a carrier that is subject to a carrier collision with the third resource, wherein the corresponding time domain resource of the carrier overlaps the time domain resource of the third resource, and wherein the carrier collision includes that in a subframe, which is indicated by the base station, of the first uplink information, a total quantity of the carrier of the first uplink information and a carrier used by second uplink information that needs to be sent by the apparatus exceeds an uplink carrier aggregation capability of the apparatus.

9. The apparatus according to claim 8, wherein the second uplink information is the PUCCH that comprises channel state information (CSI).

10. The apparatus according to claim 8, wherein sending the second uplink information based on the fourth resource comprises at least one of the following:

the second uplink information is a PUCCH comprising hybrid automatic repeat request (HARQ); and the first uplink information is periodic SRS, and the second uplink information is a PUCCH.

11. The apparatus according to claim 8, wherein the time domain resource used by the first uplink information comprises at least one of location information of the subframe occupied by the first uplink information, orthogonal frequency division multiplexing (OFDM) location information, cyclic shift information, and an SRS sending subframe offset.

12. The apparatus according to claim 8, wherein the first transmission indication information comprises a carrier identifier of the first uplink information, the carrier is a switched-to carrier and no PUSCH is sent on the carrier.

13. The apparatus according to claim 8, wherein the apparatus receives the first transmission indication information through a high-layer signaling.

14. User equipment (UE) comprising a memory, a transceiver, and a processor, wherein the memory is configured to store an instruction; and the processor is configured to execute the instruction stored in the memory, and control the transceiver to perform:

receiving first transmission indication information of first uplink information and second transmission indication information of second uplink information that are sent by a base station, wherein the first uplink information is periodic or aperiodic sounding reference signal (SRS), wherein the first transmission indication information comprises a third resource, wherein the third resource indicates at least one of a time domain resource, a frequency domain, and a space domain resource that are/is used by the UE to send the first uplink information, wherein the second uplink information is a physical uplink control channel (PUCCH) or a physical uplink shared channel (PUSCH), wherein the second transmission indication information comprises a fourth resource, and wherein the fourth resource indicates at least one of a time domain resource, a frequency domain, and a space domain resource that are/is used by the UE to send the second uplink information; and sending the first uplink information based on the third resource or sending the second uplink information based on the fourth resource, wherein the UE does not send the second uplink information on a corresponding time domain resource of a carrier that is subject to a carrier collision with the third resource, wherein the corresponding time domain resource of the carrier overlaps the time domain resource of the third resource, and wherein the collision includes that in a subframe, which is indicated by the base station, of the first uplink information, a total quantity of the carrier of the first uplink information and a carrier used by second uplink information that needs to be sent by the UE exceeds an uplink carrier aggregation capability of the UE.

15. The UE according to claim 14, wherein the second uplink information is the PUCCH that comprises channel state information (CSI).

16. The UE according to claim 14, wherein sending the second uplink information based on the fourth resource comprises at least one of the following:
   the second uplink information is a PUCCH comprising hybrid automatic repeat request (HARQ);
   the first uplink information is periodic SRS, and the second uplink information is a PUCCH.

17. The UE according to claim 14, wherein the time domain resource used by the first uplink information comprises at least one of location information of the subframe occupied by the first uplink information, orthogonal frequency division multiplexing (OFDM) location information, cyclic shift information, and an SRS sending subframe offset.

18. The UE according to claim 14, wherein the first transmission indication information comprises a carrier identifier of the first uplink information, the carrier is a switched-to carrier and no PUSCH is sent on the carrier.

19. The UE according to claim 14, wherein the UE receives the first transmission indication information through a high-layer signaling.

* * * * *